(12) United States Patent
Boerschig

(10) Patent No.: US 10,119,562 B2
(45) Date of Patent: Nov. 6, 2018

(54) ONE-HAND OPERABLE END FITTING CONNECTOR ASSEMBLY

(71) Applicant: ITT Manufacturing Enterprises LLC, Wilmington, DE (US)

(72) Inventor: Timothy J. Boerschig, Amherst, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 14/571,587

(22) Filed: Dec. 16, 2014

(65) Prior Publication Data

US 2016/0169273 A1    Jun. 16, 2016

(51) Int. Cl.
  *F16C 7/02*       (2006.01)
  *F16C 11/06*    (2006.01)
  (Continued)

(52) U.S. Cl.
  CPC ...... *F16C 11/0614* (2013.01); *F16C 11/0685* (2013.01); *F16C 23/045* (2013.01);
  (Continued)

(58) Field of Classification Search
  CPC .......... F16C 11/069; F16C 7/02; F16C 11/08; F16C 11/0685; F16C 11/06;
  (Continued)

(56) References Cited

U.S. PATENT DOCUMENTS

| 2,781,238 A | * | 2/1957 | Carter | F16C 11/0614 |
| | | | | 384/208 |
| 2,804,679 A | * | 9/1957 | Tracy | B21K 1/04 |
| | | | | 29/520 |

(Continued)

FOREIGN PATENT DOCUMENTS

| CN | 2763612 Y | 3/2006 |
| CN | 101313157 A | 11/2008 |

(Continued)

OTHER PUBLICATIONS

Design of Plastic Parts; David Kazmer, copyright © 2011; pp. 535-551; 17 pages.

(Continued)

*Primary Examiner* — Adam D Rogers
(74) *Attorney, Agent, or Firm* — Barclay Damon, LLP

(57) ABSTRACT

An end fitting connector assembly includes an end fitting having a first end, a second end and a through opening that extends in a direction that is transverse to an end fitting axis extending through the first and second ends and in which the through opening is defined by a peripheral wall. An elastically deformable race fitted into the through opening of the end fitting includes an exterior surface that engages the peripheral wall and an interior surface configured to provide snap fitting engagement with a spherical ball mount. At least one feature retaining the race within the end fitting creates an increased disassembly force, which may prevent disassembly without employing a release tool or release feature. The interior and exterior surfaces of the race can include spherical surfaces for conforming to the spherical ball and the peripheral wall of the end fitting.

17 Claims, 19 Drawing Sheets

(51) Int. Cl.
*F16C 33/04* (2006.01)
*F16C 23/02* (2006.01)
*F16C 23/04* (2006.01)
F16C 11/08 (2006.01)
F16C 35/02 (2006.01)
F16C 9/00 (2006.01)
F16C 33/08 (2006.01)

(52) U.S. Cl.
CPC .................... *F16C 7/02* (2013.01);
*F16C 9/00* (2013.01); *F16C 11/0695*
(2013.01); *F16C 11/08* (2013.01); *F16C
33/046* (2013.01); *F16C 33/08* (2013.01);
*F16C 35/02* (2013.01)

(58) Field of Classification Search
CPC ............ F16C 11/0661; F16C 11/0623; F16C
11/0604; F16C 11/00647; F16C 9/00;
F16C 9/04; F16C 11/0614; F16C
11/0695; F16C 23/045; F16C 33/046;
F16C 33/08; F16C 35/02; B60G 7/005;
B60G 2204/416; Y10T 74/2142; Y10T
403/32737
See application file for complete search history.

(56) References Cited

U.S. PATENT DOCUMENTS

| | | | | |
|---|---|---|---|---|
| 2,876,029 | A * | 3/1959 | Latzen | B29C 70/58 403/133 |
| 3,068,551 | A * | 12/1962 | Cobb | F16C 11/0614 29/441.1 |
| 3,089,718 | A | 5/1963 | Gottschald et al. | |
| 3,124,396 | A * | 3/1964 | Barager | F16C 19/20 384/522 |
| 3,382,015 | A | 5/1968 | Steidl | |
| 3,700,295 | A * | 10/1972 | Butzow | F16C 23/045 384/210 |
| 3,753,584 | A | 8/1973 | Kindel et al. | |
| 3,862,807 | A | 1/1975 | Doden et al. | |
| 3,929,396 | A * | 12/1975 | Orkin | C08F 263/06 384/203 |
| 4,134,842 | A * | 1/1979 | Orkin | C08F 263/06 264/242 |
| 4,260,275 | A | 4/1981 | Chevallier | |
| 4,701,990 | A | 10/1987 | Kehl et al. | |
| 4,714,477 | A | 12/1987 | Fichera et al. | |
| 5,372,446 | A | 12/1994 | Chamberlin | |
| 5,653,547 | A * | 8/1997 | Teramachi | F16C 11/0614 403/132 |
| 5,752,780 | A | 5/1998 | Dorr | |
| 5,775,815 | A * | 7/1998 | Abusamra | F16C 11/0614 384/208 |
| 5,865,558 | A | 2/1999 | Cebollero | |
| 6,164,829 | A | 12/2000 | Wenzel et al. | |
| 6,352,368 | B1 * | 3/2002 | James | F16C 11/0614 384/203 |
| 6,413,003 | B1 * | 7/2002 | Schmidt | B62D 7/16 403/120 |
| 6,748,820 | B2 | 6/2004 | Ruhlander | |
| 7,010,844 | B2 * | 3/2006 | Pekarsky | B23P 11/005 29/451 |
| 7,040,833 | B2 * | 5/2006 | Kondoh | F16C 11/0638 403/135 |
| 7,097,361 | B2 * | 8/2006 | Rogers | B62D 7/166 384/213 |
| 7,947,065 | B2 | 5/2011 | Hammill, Sr. et al. | |
| 8,137,021 | B2 | 3/2012 | Bohne et al. | |
| 8,282,305 | B2 | 10/2012 | Rechtien et al. | |
| 8,388,253 | B2 | 3/2013 | McClelland | |
| 8,505,204 | B2 * | 8/2013 | Reverchon | B29C 45/14311 29/898.04 |
| 8,690,438 | B2 * | 4/2014 | Karaki | F16C 33/201 384/213 |
| 8,734,044 | B2 | 5/2014 | Schaumann | |
| 8,925,944 | B2 * | 1/2015 | Byrnes | B60G 7/005 280/124.134 |
| 9,343,862 | B2 * | 5/2016 | Zink | H01R 39/643 |
| 9,695,869 | B2 * | 7/2017 | Blachon | F16C 23/046 |
| 2008/0138150 | A1 * | 6/2008 | Budde | F16C 11/0638 403/135 |
| 2009/0060633 | A1 * | 3/2009 | Broker | F16C 11/0614 403/2 |
| 2009/0288297 | A1 | 11/2009 | Schmidt et al. | |
| 2013/0236238 | A1 | 9/2013 | Burton | |
| 2013/0308995 | A1 * | 11/2013 | Girard | F16C 11/06 403/27 |
| 2015/0063899 | A1 * | 3/2015 | Sato | F16C 11/0638 403/122 |
| 2015/0204378 | A1 * | 7/2015 | Teulou | F16C 11/0614 403/123 |
| 2016/0003293 | A1 * | 1/2016 | Blachon | F16C 23/046 384/212 |

FOREIGN PATENT DOCUMENTS

| | | | | |
|---|---|---|---|---|
| CN | 102562777 A | | 7/2012 | |
| DE | 73 02 251 U | | 1/1973 | |
| EP | 0 075 414 B1 | | 11/1985 | |
| EP | 1964694 A2 * | | 9/2008 | ............ B60G 7/005 |
| FR | 2 957 992 A1 | | 9/2011 | |
| GB | 1 423 032 A | | 1/1976 | |
| JP | 4298713 B2 * | | 7/2009 | ............ F16C 33/74 |
| WO | WO 2006/084558 A1 | | 8/2006 | |
| WO | WO 2007/035821 A2 | | 3/2007 | |

OTHER PUBLICATIONS

European Search Report for EP 15 199 453.0; dated May 18, 2016; 7 pages.
European Examination Report for EP 15 199 453.0; dated Apr. 17, 2018; 2 pages.
Chinese Office Action and Search Report for CN 201510941457.7 dated Aug. 17, 2018; 11 pages.

* cited by examiner

ONE-HAND OPERABLE END FITTING CONNECTOR ASSEMBLY

TECHNICAL FIELD

This application is generally directed to the field of component manufacture and more specifically directed to an end fitting connector assembly that permits one-handed assembly for efficiently and reliably enabling use in various structural applications.

BACKGROUND

So called "quick connect" end fitting connectors are known for use in various assemblies, such as linear or hydraulic rate control or actuator assemblies. In a typical configuration, an axially movable rod end of a rate control or an actuator component is engaged with an end fitting, such as a clevis, to provide engagement with a spherical ball mount that is attached to a mated structure.

By way of example and referring to FIG. 1, there is shown a prior art end fitting connector assembly 10 that is used to interconnect an axially movable rod end 14 with a structure, such as a stowage bin of a stowage compartment typically found in commercial aircraft, the latter including a retainer plate 18. The retainer plate 18 includes a plurality of attachment holes 22, which are spaced and configured to receive fasteners (not shown) for fixedly securing same to a structure (not shown). Disposed at the movable rod end 14 is a clevis lug 28, which is defined by a substantially T-shaped body. The clevis lug 28 is configured for engagement with a corresponding T-shaped receiving slot 32 of a clevis mount 40 that is pivotally secured to the retainer plate 18. In operation, the clevis lug 28 is mated to the clevis mount 40, and more specifically the T-shaped receiving slot 32, wherein the clevis lug 28 includes a spring retention clip 44 at its distal end that creates positive engagement upon attachment to the clevis mount 40.

When properly engaged, this end fitting connector assembly 10 does not permit disassembly without the aid of a release tool (not shown). According to this version, the release tool can be introduced into the T-shaped receiving slot 32 and more specifically into direct engagement against the spring retention clip 44 to compress same and enable the clevis lug 28 to be removed from the T-shaped receiving slot 32 of the clevis mount 40.

There is a general need in the field to simplify the design of end fitting connectors, such as those shown in FIG. 1, but without sacrificing reliability. There is a similar need to provide an end fitting that enables one handed assembly, but prevents disassembly preferably without the use of a tool or other release feature.

BRIEF DESCRIPTION

Therefore and according to one aspect, there is provided an end fitting connector assembly comprising an end fitting having a first end, a second end and a through opening transversely disposed in relation to an axis passing through the first and second ends, the through opening being defined by a peripheral wall. An elastically deformable race is fitted within the circular opening of the end fitting, the race having an outer surface that engages the peripheral wall and an inner surface that is configured to engage a spherical ball mount.

In at least one version, the end fitting connector assembly further includes at least one feature that maintains the elastically deformable race in a predetermined position relative to the transverse through opening of the end fitting, such that the spherical ball mount cannot easily be removed following assembly.

In one version, one of the race or the peripheral wall includes a raised circumferential ridge and the other of the race and the peripheral wall includes an annular groove sized for receiving the raised circumferential ridge and defining the features for retaining the race in the predetermined position.

The elastically deformable race can be defined by a ring-like configuration having a slit along the circumference thereof that creates a split ring configuration. The elastically deformable race or the annular groove of the peripheral wall of the end fitting can further include at least one raised circumferential ridge, which is configured and sized to engage an annular groove formed in the other of the peripheral wall of the end fitting and the race. In one version, at least one of the annular groove and the raised circumferential ridge can be defined by square edges, while in another version the annular groove can be defined by tapered walls that are aligned with the raised circumferential ridge in order to create an additional compressive force and/or a "locking" feature that increases the force required for assembly or disassembly and in at least some instances requiring a tool or other release feature.

In another version, the outer surface of the elastically deformable race and the peripheral wall of the through opening of the end fitting can include aligned grooves though which a locking element can be transversely disposed to effect disassembly by effectively locking the race with the end fitting and preventing the race to translate along with the ball mount. Based on the spherical or angled surfaces of these components, disassembly can be effected. The locking element can be integrally disposed within the end fitting or can be provided separately in which the end fitting is configured for accepting the locking element and can be engaged for release by a tool.

Though the race can be made from plastic, it may also be manufactured from other suitable materials, including metal, to serve the intended functionality of being elastically deformable as discussed herein. For example and according to at least one version, an elastically deformable race can be defined by a metal body defined by a radially protruding center portion and a pair of opposed axial ends. Each of the axial ends include a series of spaced castellations that form cantilevered springs about the periphery of the end fitting when the race is attached thereto. Via the cantilevered springs, a ball mount can be assembled and wherein the springs form a resistive force to prevent disassembly.

In yet another version, the peripheral wall of the end fitting can include a pair of recessed portions that are aligned with outwardly extending end portions of the race and configured to increase the amount of force that is required for disassembly.

According to another aspect, there is provided a method for enabling one-handed operation of an end fitting connector assembly, the method comprising:

providing an end fitting having a first end, an opposing second end and a through opening between the first and second ends that is transverse to an axis extending between the first and second ends, the through opening further defining a peripheral wall; and providing an elastically deformable race that is sized to be engaged within the through opening of the end fitting, the race having an exterior spherical surface in contact with the peripheral wall and an inner surface configured to directly and snapfittingly engage a spherical ball mount.

In at least one embodiment, at least one of the elastically deformable race and the peripheral wall of the end fitting are provided with at least one engagement feature for retaining the race in a predetermined position. In one such version, the engagement feature includes a raised circumferential ridge of one of the race and peripheral wall that engages an annular groove of the other.

The annular groove can include tapered or angled surfaces to provide a locking effect.

In yet another version, the outer surface of the elastically deformable race and the peripheral wall of the through opening of the end fitting can include aligned grooves though which a locking element can be transversely disposed to effect disassembly by effectively locking the race with the end fitting and preventing the race to translate along with the ball mount. Based on the spherical or angled surfaces of these components, disassembly can be effected. The locking element can be integrally disposed within the end fitting or can be provided separately in which the end fitting is configured for accepting the locking element and can be engaged for release by a tool.

The elastically deformable race can be made from plastic and can further be defined by a split-ring configuration. In one such version, a slit is provided in the race to enable elastic deformation. This slit can be defined, for example, by a scarf cut. In at least one version, the scarf cut can be angled.

According to yet another aspect, there is provided a rate control or an actuator comprising a rod member having at least one end, and an end fitting connector assembly attached to the at least one end of the rod member. The end fitting connector assembly comprises an end fitting having a first end, a second end and a through opening extending in a direction that is transverse to an axis passing through the first and second ends, the through opening defining a peripheral wall; and an elastically deformable race disposed within the through opening of the end fitting and having a substantially spherical exterior surface engaged with the peripheral wall, at least one of the race or the end fitting having a feature that retains the race in a predetermined position, the race having a substantially spherical interior surface configured for positive engagement with a spherical ball mount.

In one version, one of the race or the peripheral wall includes a raised circumferential ridge and the other of the race and the peripheral wall includes an annular groove sized for receiving the raised circumferential ridge and defining the features for retaining the race in the predetermined position.

The elastically deformable race can be defined by a ring-like configuration having a slit along the circumference thereof that creates a split ring configuration. The elastically deformable race or the annular groove of the peripheral wall of the end fitting can further include at least one raised circumferential ridge, which is configured and sized to engage an annular groove formed in the other of the peripheral wall of the end fitting and the race. In one version, at least one of the annular groove and the raised circumferential ridge can be defined by square edges, while in another version the annular groove can be defined by tapered walls that are aligned with the raised circumferential ridge in order to create an additional compressive force and/or a "locking" feature that increases the force required for assembly or disassembly and in at least some instances requiring a tool or other release feature.

In another version, the outer surface of the elastically deformable race and the peripheral wall of the through opening of the end fitting can include aligned grooves though which a locking element can be transversely disposed to effect disassembly by effectively locking the race with the end fitting and preventing the race to translate along with the ball mount. Based on the spherical or angled surfaces of these components, disassembly can be effected. The locking element can be integrally disposed within the end fitting or can be provided separately in which the end fitting is configured for accepting the locking element and can be engaged for release by a tool.

One advantage realized by the foregoing assembly design is that of simplicity in that fewer parts are utilized than previously known end fitting assemblies having similar functionalities. As a result, the herein described end fitting connector assembly is both simpler and cheaper to manufacture/fabricate.

Another advantage provided by the herein described assembly is ease in use, as compared with previously known end fitting assemblies. Simple one-handed operation is assured during assembly of the ball mount to the joint. In at least one version, disassembly can be readily conducted. According to another version, the force required to disassemble the ball from the assembly can be made considerably higher than the force required to assemble for example, requiring a tool or other release feature to effect disassembly.

Yet another advantage is that the herein described end fitting assembly is symmetrical such that the formed joint can be made and/or unmade from either side or direction of the end fitting.

Still another advantage is that of improved reliability since relatively fragile components, such as the herein described elastically deformable race, are protected within the end fitting, the latter acting as a container or receptacle.

Still further, yet another advantage realized is that no special tooling is required to assemble the race to the end fitting.

The herein described assembly is also lighter than prior known connector assemblies.

Furthermore, the herein described concepts can further be applied to literally any form of connection including cylinder ends, stays, struts and the like for which a quick connect fitting is desired that provides retention about a ball or similar mount, while providing some degree of permissible misalignment.

These and other features and advantages will be readily apparent from the following Detailed Description, which should be read in conjunction with the accompanying drawings.

DETAILED DESCRIPTION

Figure 1:
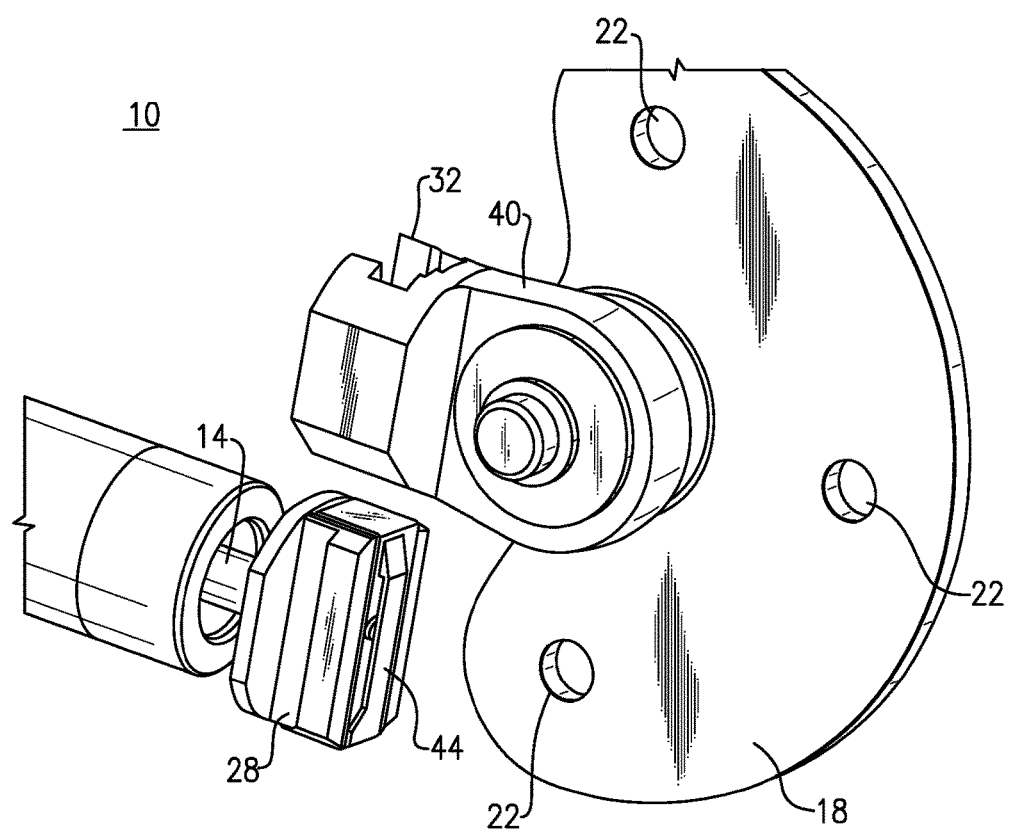
FIG. 1 is a partial perspective view of an end fitting connector assembly in accordance with the prior art.
Figure 2:
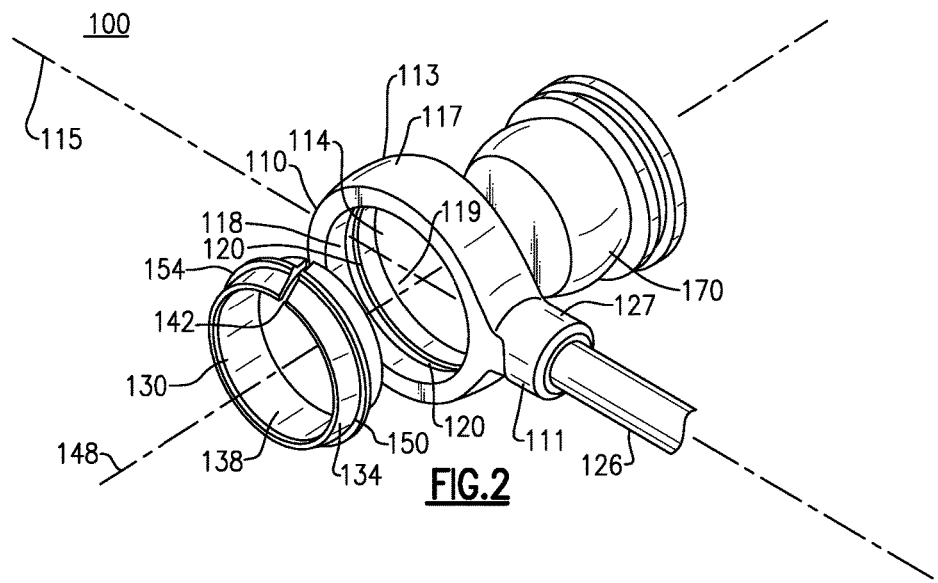
FIG. 2 is an exploded assembly view of an end fitting connector assembly made in accordance with an exemplary embodiment.
Figure 4:
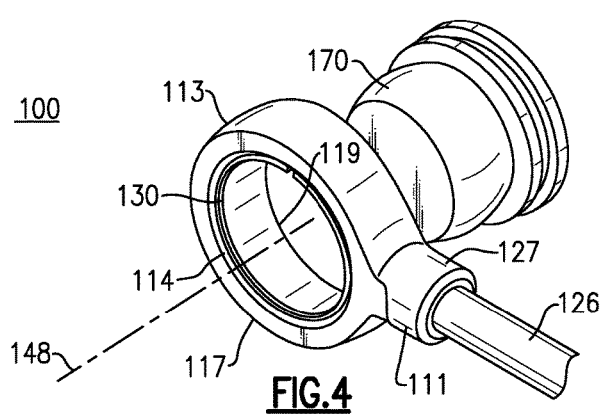
FIG. 4 is a partially exploded view of the end fitting assembly of FIGS. 2 and 3, following the assembly of the race to the end fitting.
Figure 5:
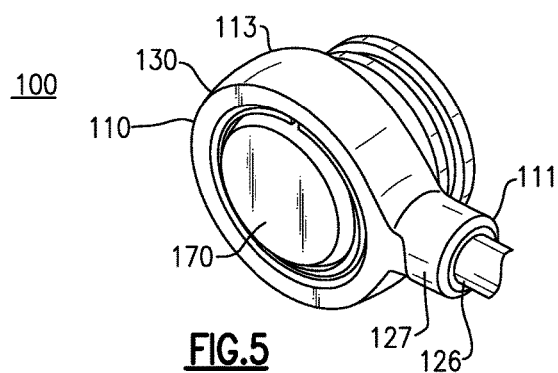
FIG. 5 is an assembled view of the end fitting connector assembly of FIGS. 2-4.

The following refers to certain and exemplary embodiments of a one-hand operable end fitting connector assembly intended for use in various applications, including but not limited to actuators, mounts rate controls, shocks, struts, stays, cable assemblies and the like and particularly those instances in which in plane rotation about the transverse hole axis in the end fitting assembly is required and where some degree of misalignment between attachment points/planes may be anticipated, such as, for example, an instance in which a spherical ball joint is desirable. For example and according to one specific version, the end fitting connector assembly can be used in conjunction with a rate controlling actuator for an overhead stowage bin used in commercial aircraft. It will be readily apparent, however, that other suitable uses or applications for the herein described assembly can be easily contemplated by those persons of adequate skill. In addition and throughout this discussion, several terms are frequently used in order to provide a suitable frame of reference in regard to the accompanying drawings. These terms, which include "lateral", "peripheral", "inner", "outer", "above", "interior", "exterior", "below", "distal" and "proximal", among others, are not intended to be limiting of the inventive concepts that are discussed and claimed herein, except in those instances in which such intent is specifically and clearly indicated.

This brief description is intended only to provide a brief overview of subject matter disclosed herein according to one or more illustrative embodiments, and does not serve as a guide to interpreting the claims or to define or limit scope, which is defined only by the appended claims. This brief description is provided to introduce an illustrative selection of concepts in a simplified form that are further described below in the Detailed Description. This brief description is not intended to identify key features or essential features of the claimed subject matter, nor is it intended to be used as an aid in determining the scope of the claimed subject matter. The claimed subject matter is not limited to implementations that solve any or all disadvantages noted in the Background.

As used in this specification and the appended claims, the singular forms "a", "an" and "the" are intended to further include plural referents unless the context clearly dictates otherwise.

The term "about" as used in connection with a numerical value throughout the description and the claims denotes an interval of accuracy, familiar and acceptable to a person skilled in the art. The interval governing this term is preferably +20%.

Referring to FIGS. 2-5, an end fitting connector assembly 100 made in accordance with a first exemplary embodiment is defined by an end fitting 110, including a clevis or other similar component. The end fitting 110 is defined by a fitting body having a proximal end 111 and a distal end 113, in which a through opening 114 extends in a direction that is transverse to a center axis 115 of the end fitting 110 extending through the proximal and distal ends 111, 113. According to this embodiment, the end fitting 110 is fabricated from a structural material, such as stainless steel or an aluminum alloy though it should be noted that other suitable materials, such as a hard and durable plastic, can alternatively be used for purposes of manufacture of this component. The transverse through opening 114, according to this specific embodiment, is substantially circular and defined by a center axis 148, as well as a peripheral wall 118 forming an outer radial boundary of the through opening 114. As discussed herein, the center axis 148 also defines an assembly axis for purposes of the end fitting 110 and all components mounted within the through opening 114. According to this exemplary embodiment, an annular groove 120 is disposed in approximately the center of the peripheral wall 118 between opposing opening ends 117, 119 of the through opening 114. The proximal end 111 of the end fitting 110 in accordance with this embodiment includes an engagement portion 127 that is configured to fixedly support one end of a cylindrical rod 126.

Figure 6:
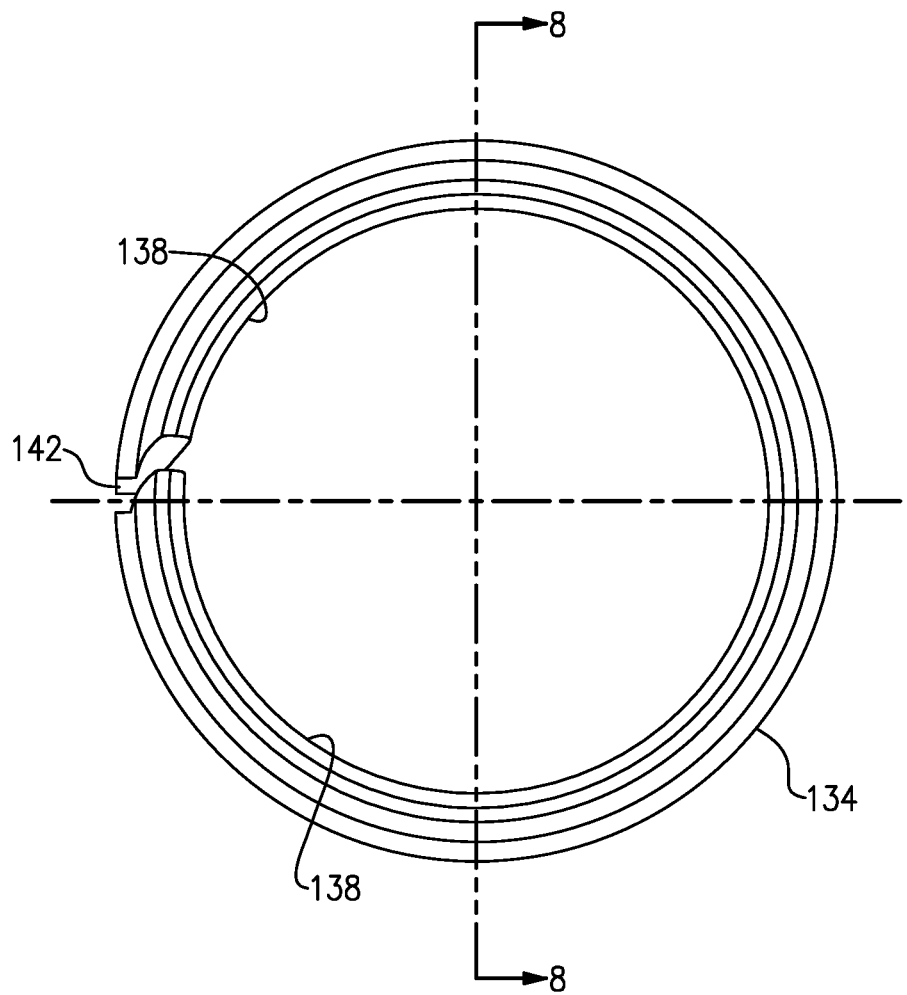
FIG. 6 is a top plan view of a elastically deformable race for the end fitting connector assembly and in accordance with an exemplary embodiment.
Figure 7:
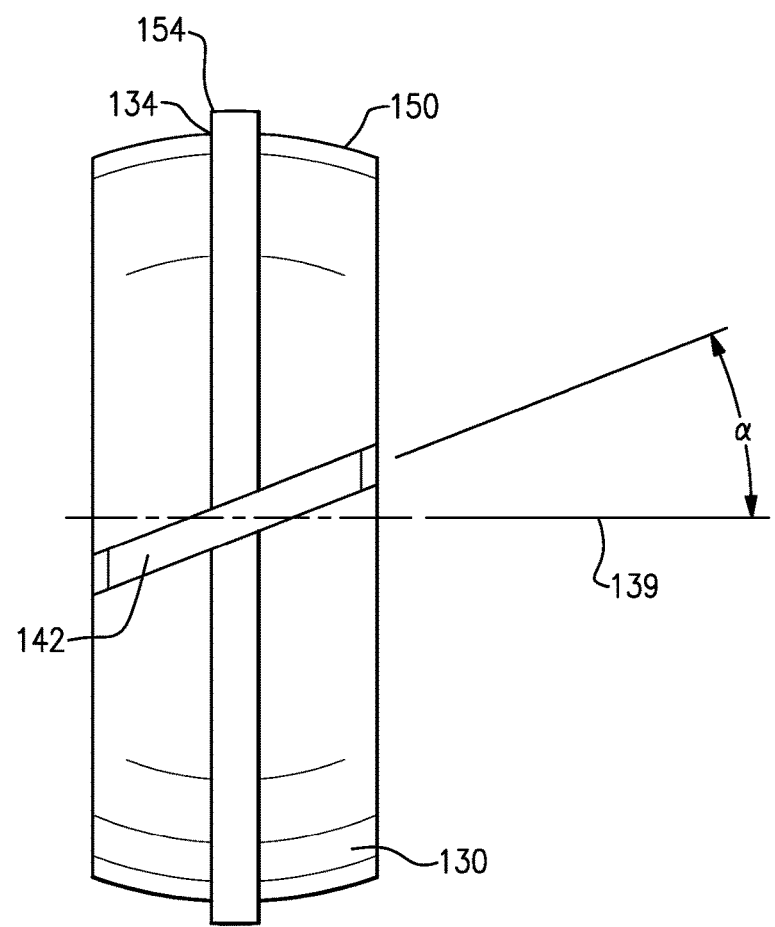
FIG. 7 is a side facing view of the elastically deformable race of FIG. 6.
Figure 8:
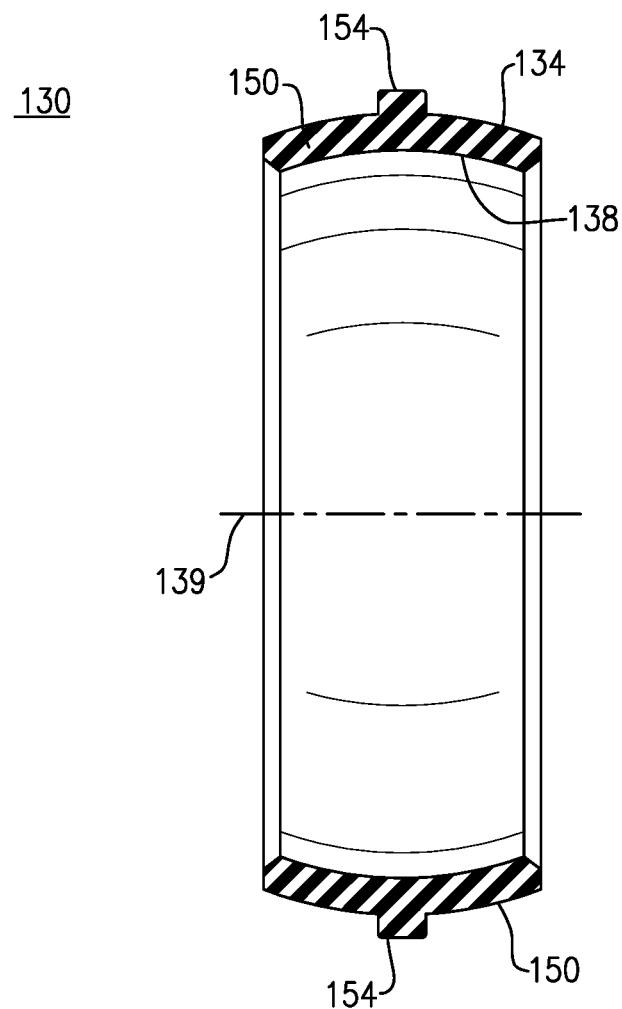
FIG. 8 is a side sectioned view of the elastically deformable race of FIGS. 6 and 7, taken through section lines 8-8 of FIG. 6.

The end fitting connector assembly 100 further includes a race 130 that is configured to be positioned within the transverse through opening 114 of the end fitting 110. According to this specific embodiment and as shown more clearly in FIGS. 6-8, the race 130 is a ring-like member having an outer or exterior surface 134 and an inner or interior surface 138 in which the outer surface 134 of the race 130 is configured to engage the peripheral wall 118 of the end fitting 110 in an elastically deformable manner. According to this embodiment, the race 130 is preferably made from a sufficiently flexible and durable plastic material, such as acetal although other elastically deformable materials can be utilized. A slit 142 is formed in the race 130, creating a split ring configuration. According to this specific embodiment and as more clearly shown in FIGS. 7 and 8, the slit 142 is formed by means of a scarf cut formed preferentially at an angle α relative to the center axis 139 of the race 130, which when assembled is coaxial with the axis 148 of the through opening 114. According to this embodiment, the angle α is about 15 degrees, although this parameter can be suitably varied. The exterior surface 134 of the race 130 is largely defined by a spherical or substantially spherical configuration 150, as well as a raised circumferential ridge 154 disposed at approximately the center of the race 130 and substantially aligned along the axis 115 at the time of assembly of the end fitting 110. Alternatively and in lieu of being spherical, the exterior surface 134 of the race 130 can be defined using angled surfaces (not shown) disposed to either side of the annular ridge 154. Typically, a suitable range of angles can be about 5 to about 30 degrees.

Figure 3:
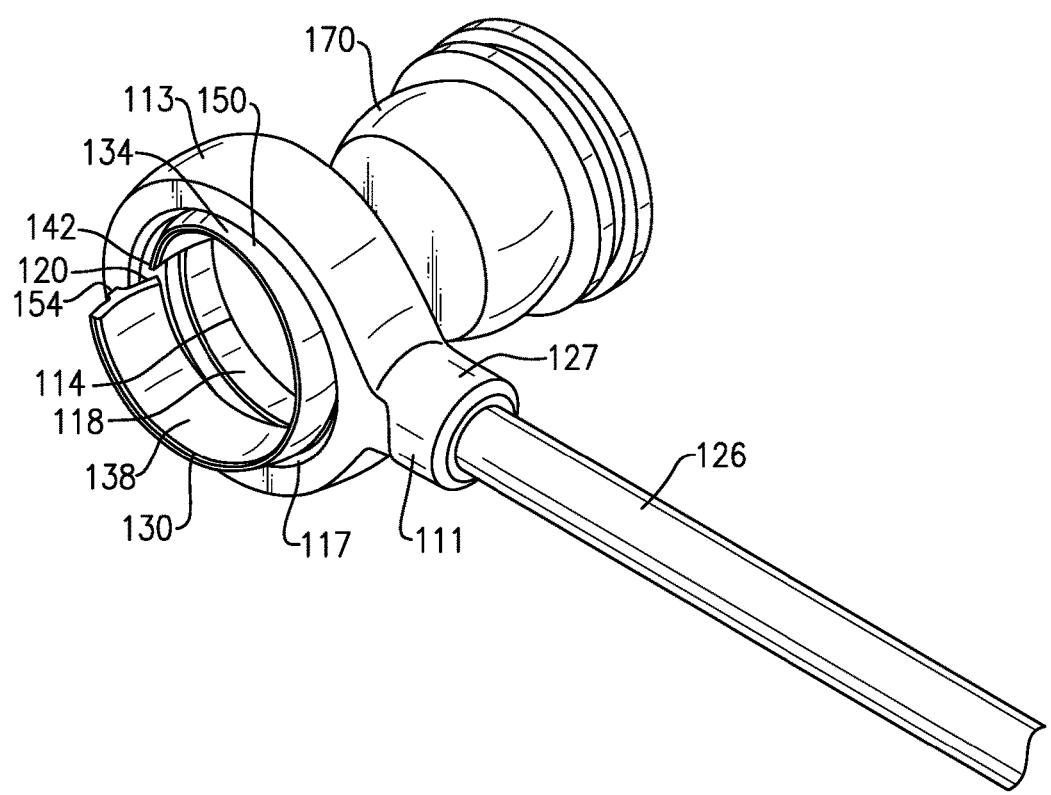
FIG. 3 is a partially exploded assembly view of the end fitting connector assembly of FIG. 2, depicting the assembly of a race relative to an end fitting.

According to this specific embodiment, the elastically deformable race 130 is defined by an outer diameter (excluding that of the circumferential raised ridge 154) that is slightly smaller than that of the diameter of the center opening 114 of the end fitting 110. The diameter selected for use should be based on several factors including, but not limited to the desired amount of installation and retention force as well as load and wear capacity. In any case, however, this sizing should permit the elastically deformable race 130 to expand sufficiently to permit installation and removal of the ball mount 170. As shown in FIG. 3, the scarf cut defining the slit 142 permits the elastically deformable race 130 to be installed into the transverse through opening 114 of the end fitting 110 by elastically deforming the race 130 and more specifically elastically curling the race 130 to a smaller diameter and then allowing expansion once the race 130 is in a predetermined position. According to this embodiment, the formed split ring configuration as well as the substantially spherical outer surface 134 permits the race 130 to be assembled and secured with the raised circumferential ridge 154 being positively engaged with the annular groove 120 of the end fitting 110, thereby fixing the race 130 into the predetermined position depicted in FIG. 10.

Referring to FIGS. 3-5 and 10, a ball mount 170 having a spherical outer surface 174 over at least a portion thereof can then be snap-fitted within the end fitting connector assembly 100 and more specifically provide positive retaining engagement between the substantially spherical inner surface 138 of the race 130 and the outer spherical surface 174 of the ball mount 170.

Figure 9:
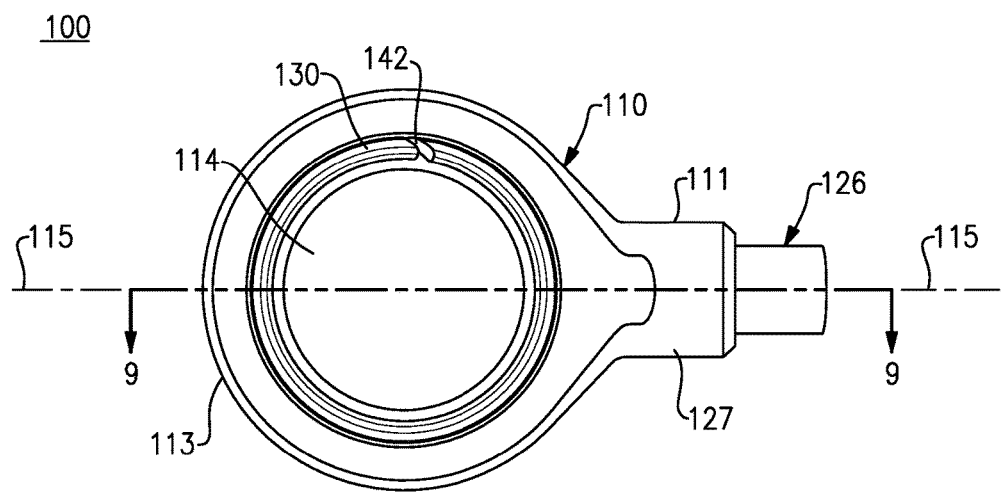
FIG. 9 is a top view of the end fitting connector assembly of FIG. 2.
Figure 10:
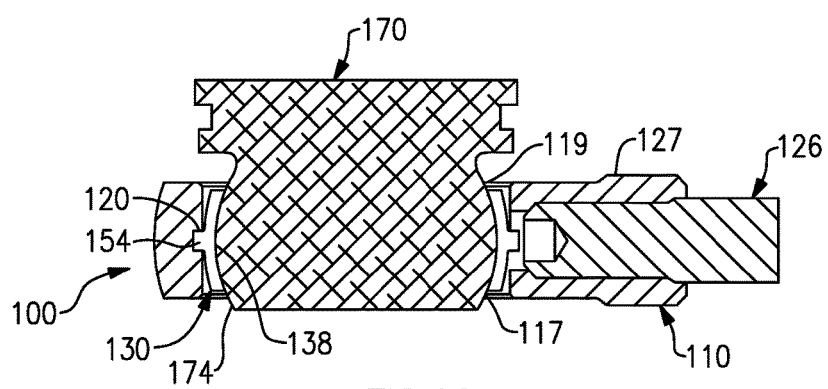
FIG. 10 is a sectioned view of the end fitting connector assembly of FIG. 5, as taken through section lines 9-9 of FIG. 9.

When assembled and according to FIGS. 9 and 10, the transverse through opening 114 of the end fitting 110 provides a container or receptacle for the elastically deformable race 130, supporting the race 130 and protecting it from damage, wherein a connective link is provided to the device that the herein described assembly 100 is attached. The end fitting 110 also limits how much the race 130 may open at the slit 142 such that, once the outer diameter of the race 130 contacts the inner diameter face of the transverse center opening 114, the race 130 must elastically expand at one or the other end in the race 130 (i.e., proximal to the ends 117, 119, FIG. 10) as the ball mount 170 enters or exits. If the race 130 is not adequately restrained within the end fitting body 110, the race 130 would simply open at the slit 142 with relative ease and be rendered relatively ineffective in restraining the ball mount 170. In other words, the fitting body 110 restrains the race 130 such that it acts almost as though the slit 142 was not present and the smaller diameter opening on either side of the race 130 must effectively "snap" over the larger diameter of the ball mount 170.

As noted and though the end fitting 110 resembles a clevis, it may take other suitable forms. The elastically deformable race 130, which can be made according to this embodiment from a moldable durable plastic, forms a "socket" into which the ball mount 170 is installed and retained. When attached, the ball mount 170 provides a 360 degree range of motion about the center axis 148 of the transverse through opening 114 of the end fitting 110, the ball mount 170 providing a compressive force against the race 130 and engaging same, the race 130 being retained by the end fitting 110. In addition, a small amount of perpendicular motion may also be permitted (typically on the order of about 5 degrees) to allow for misalignment. The ball mount 170 may be part of a stud or alternatively can be part of a bracket or other assembly. The ball mount 170 may be permitted to rotate, but such rotation may not be necessary depending on the specific application or use of the assembly.

In operation and as shown in FIGS. 2-5, 9 and 10, the joint is created by snap fitting the assembled race 130 over the ball mount 170, or by snapping the ball mount 170 into the end fitting connector assembly 100. This assembly can be performed using hand force by a single person and without requiring the use of tools or persons in which one of the two end pieces of the assembly 100 is already held stationary or resting on a support or table (not shown). The end fitting 110 and the ball mount 170 engage one another along their aligned central axes. Separation of the created joint can be effected by pulling the ball mount 170 or the end fitting 110 apart in the opposite direction.

In lieu of the raised circumferential ridge 154, the race 130 may be manufactured with a significantly wider ridge on its outer diameter that is configured to be engaged within a mating groove feature in the end fitting 110 in a snap fitting configuration. The latter type of retention is useful for insuring that disassembly will require a larger force than the force enabling the snap fit of the components.

Moreover and by profiling the faces of the annular groove 120 of the end fitting 110, a camming action can be created such that the force required for dissasembly is extremely high, as compared to the assembly force, thereby effectively preventing the joint from being easily disassembled.

Figure 11A:
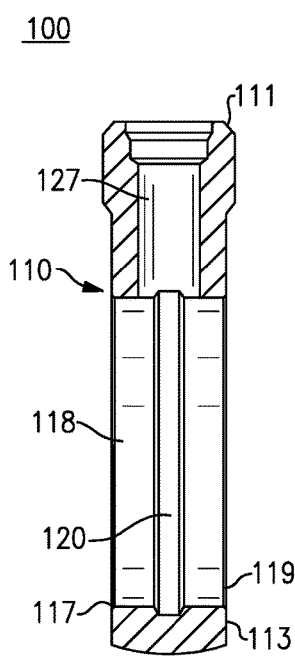
FIG. 11(a) is a sectioned view of an end fitting prior to assembly of a race in accordance with another exemplary embodiment.
Figure 11B:
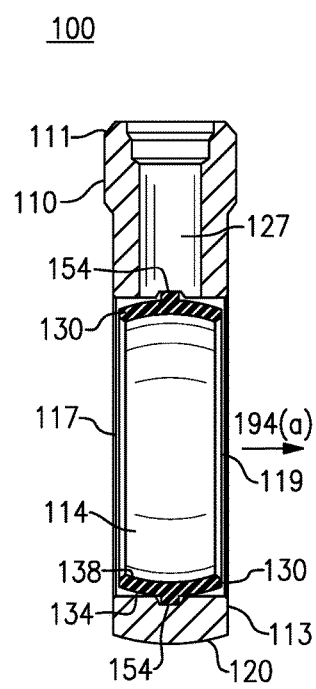
FIG. 11(b) is the sectioned view of the end fitting of FIG. 11(a), with an assembled race.
Figure 11C:
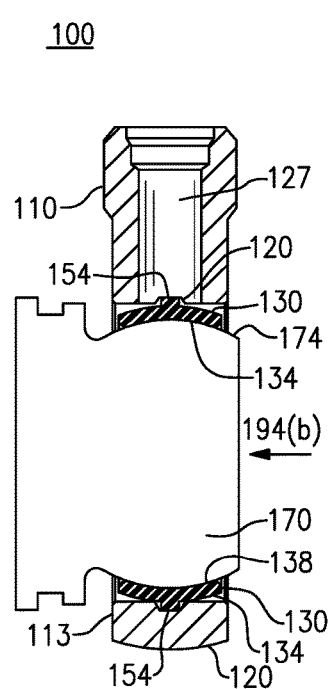
FIG. 11(c) is the sectioned view of the end fitting of FIG. 11(b) as assembled to a spherical ball mount.

One example of the foregoing design that includes a cammed annular groove 120 is shown in FIGS. 11(*a*)-12(*b*). For purposes of this discussion, similar parts are labeled with the same reference numerals for the sake of clarity.

FIG. 11(*a*) depicts an end fitting 110, in section, having a through opening 114 and peripheral wall 118 having the tapered annular groove 120. Depending on the desired retention force, a suitable angle for the taper may be greater than or less than 45 degrees, with the groove 120 having a minimum width at the bottom of the groove 120, and a maximum width at the top of the groove 120. Other than the taper in the groove 120, the end fitting 110 may be literally identical to that previously described in detail with regard to FIGS. 2-5, 9 and 10.

FIG. 11(*b*) illustrates the assembly of the elastically deformable (preferably plastic) race 130 to the end fitting 110 and more specifically to the through opening 114. As noted previously and for purposes of this discussion, the race 130 includes each of the previously described elements depicted in FIGS. 6-8 and is literally identical thereto. More specifically, the race 130 includes an outer surface 134 and an inner surface 138, each of the foregoing surfaces according to this embodiment being defined as substantially spherical edges extending along the direction of the through opening 114 and configured for engagement with the peripheral wall 118 of the through opening 114. As in the preceding, the elastically deformable race 130 has a slightly smaller outer diameter (with the exception of a raised circumferential ridge 154) than the diameter of the through opening 114 wherein a slit 142, FIG. 12(*a*), enables the race 130 to be curled elastically. This dimensioning permits the raised circumferential ridge 154 on the outer surface 134 of the race 130 to be aligned with the angled surfaces of the annular groove 120 of the peripheral wall 118 of the end fitting 110, thereby placing the elastically deformable race 130 in a predetermined position.

Figure 12A:
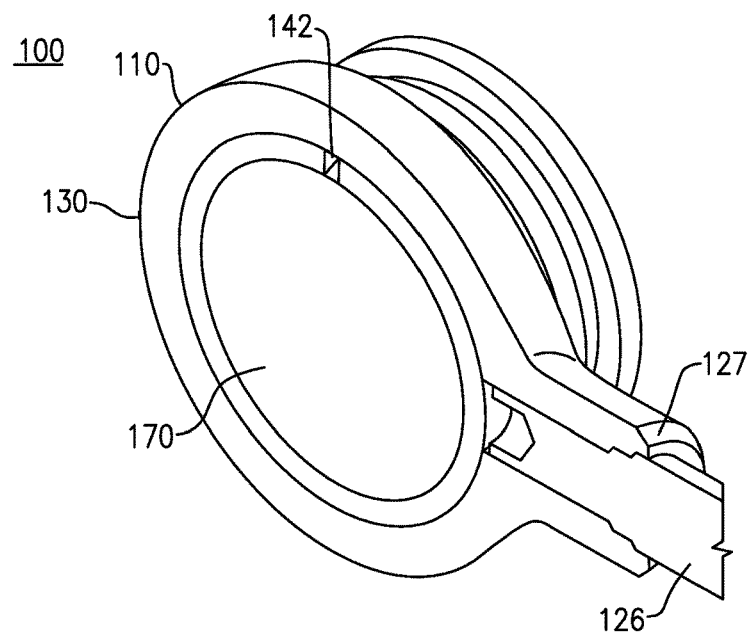
FIG. 12(a) is a perspective sectioned view of the end fitting connector assembly as attached to a spherical ball mount.
Figure 12B:
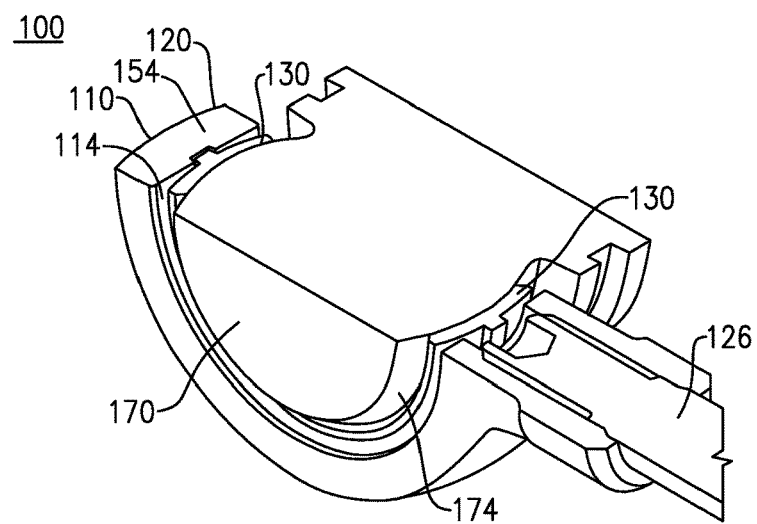
FIG. 12(b) is a perspective view of the end fitting connector assembly of FIG. 12(a), as sectioned 90 degrees relative to FIG. 12(a)

FIG. 11(*c*) illustrates the further attachment of a spherical ball mount 170 to the connector assembly 100 in which the inner surface 138 of the race 130 substantially conforms to the outer surface 174 of the spherical ball mount 170 and in which the ball mount 170 can be advantageously installed (or disassembled) in either axial direction 194(*a*) or 194(*b*) based on the symmetry of the components. FIGS. 12(*a*) and 12(*b*) illustrate separate sectioned views of this assemblage as well as the connection of a rod end 126 within an engagement portion 127 of the end fitting 110.

In operation and once installed, the angled surfaces of the annular groove 120 create a camming action. This action based on axial movement of the ball mount 170 in either the direction 194(*a*) or 194(*b*) increases the force required to disassemble the ball mount 170. More specifically, the elastically deformable race 130 is thereby configured to move with the ball mount 170, which maintains the maximum engagement of the inner surface 138 of the race 130 with the outer spherical surface 174 of the ball mount 170.

Figure 13A:
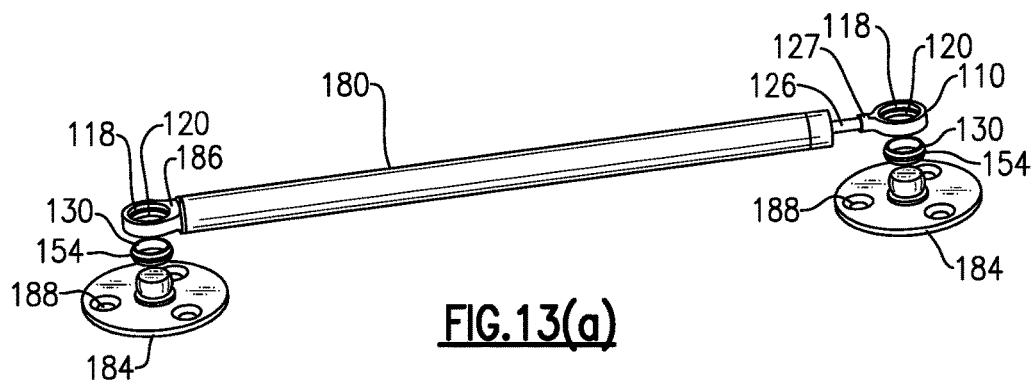
FIG. 13(a) is a perspective partially exploded view of end fitting connector assemblies relative to a structural application.
Figure 13B:
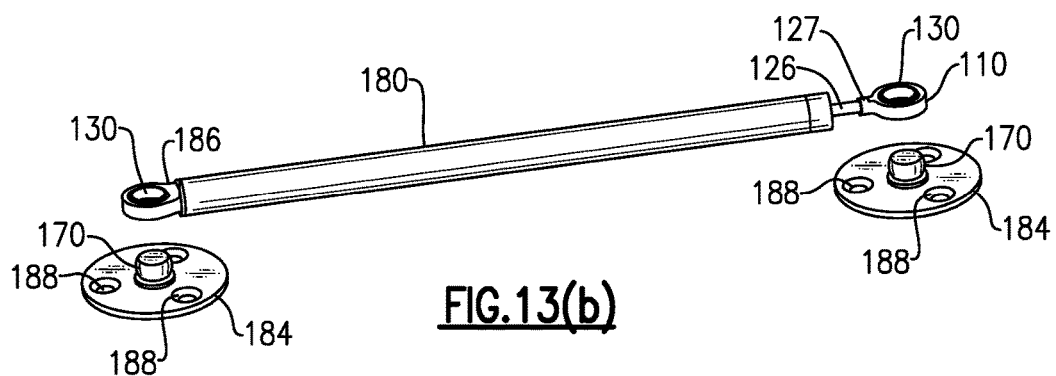
FIG. 13(b) is the perspective view of the end fitting connector assemblies, as assembled, and prior to attachment to various structural members.
Figure 13C:
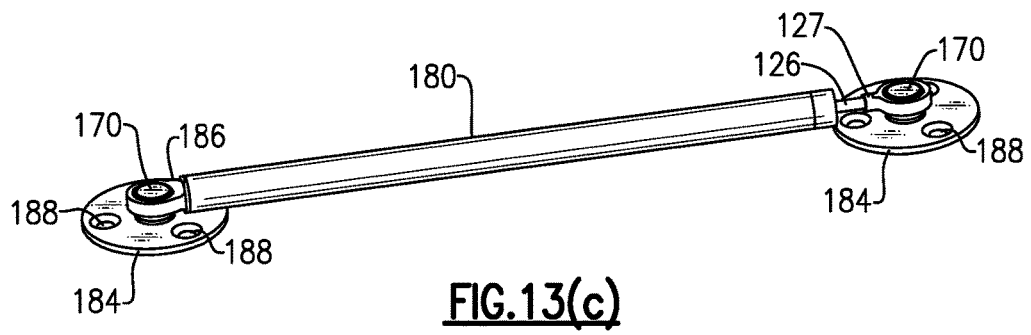
FIG. 13(c) is the perspective view of the end fitting connector assembly of FIGS. 13(a) and 13(b), as assembled to the ball mounts of the various structural members.

Referring to FIGS. 13(*a*)-13(*c*), one exemplary use of the herein described end fitting connector assembly 100 is depicted in which a rate control is defined by a cylindrical section 180 having the movable rod end 126 at one end, which is securely mounted within the engagement portion 127. Attached to a fixed opposite end of the cylindrical section 180 is an end fitting 186, the latter component being substantially similar to the end fitting 110 other than being attached to a stationary portion of the cylindrical section 180.

For purposes of assembly and as shown in FIGS. 13(*a*) and 13(*b*), the elastically deformable race 130 is attached to the respective end fittings 110, 186 in the manner previously described wherein the race 130 is elastically curled and moved into the defined transverse through opening 114 with a raised circumferential ridge 154 of the race 130 being aligned and secured within a defined annular groove on a peripheral wall 118 of the through opening 114 of the end fitting 110.

As further shown in FIGS. 13(*b*) and 13(*c*), each of the assembled end fittings 110, 186 can then be snap fitted to respective spherical ball mounts 170, each of the latter components including a retainer plate 184 having attachment holes 188 for securing the ball mount 170 using fasteners (not shown) to respective structures (not shown) in order to complete the assembly. As shown, each of the ball mounts 170 are shown beneath the cylinder section 180. Alternatively, it should be understood that the ball mounts 170 could be positioned directly above the cylinder section 180 as shown, given the symmetrical relationships of the assembled race 130 and transverse through opening 114 of the herein described end fittings 110, 186.

Figure 14A:
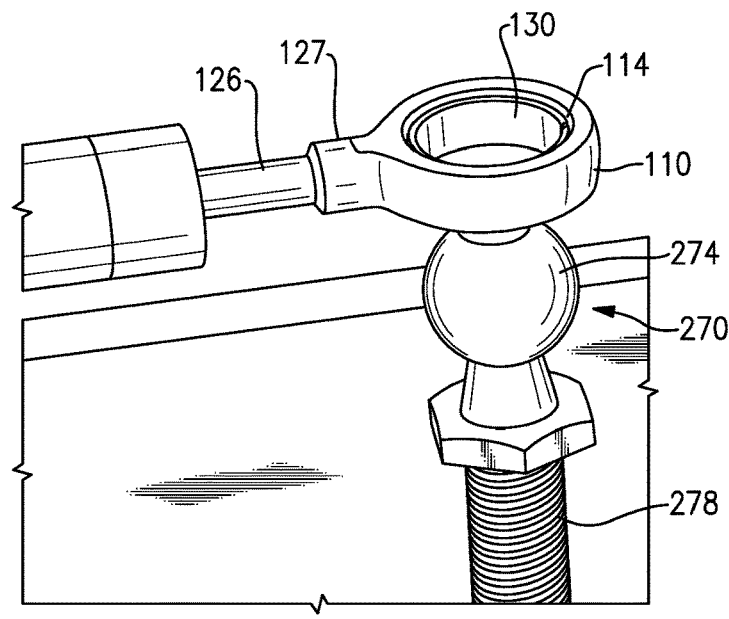
FIG. 14(a) is the end fitting connector assembly of FIG. 13(b) prior to engagement with an alternative ball mount.
Figure 14B:
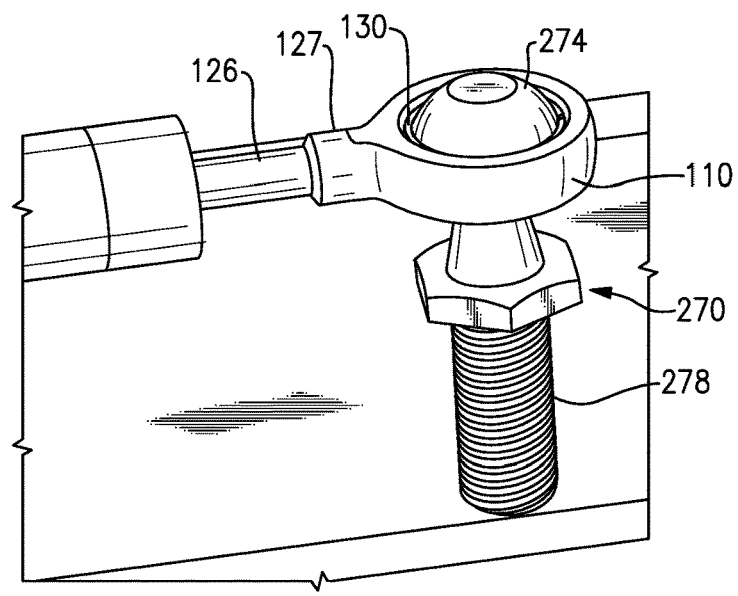
FIG. 14(b) is the end fitting connector assembly of FIG. 14(a), as attached to the ball mount.

Though a ball having a spherical surface over at least a portion thereof is necessary for purposes of securement of the end fitting connector assembly described herein, the remaining features of the ball mount itself can be made according to a number of configurations. For example, different mounting configurations for the ball itself can be utilized, as shown for example in FIGS. 14(*a*) and 14(*b*), in which an alternative ball mount 270 includes a spherical ball end 274, similar to those previously described, that is integral to an axial threaded portion 278 in lieu of a retaining plate 184, FIG. 13(*a*), on either or both sides of the assembly. It will be understood that other suitable variations can be contemplated including stud, plate or other variations.

Figure 15:
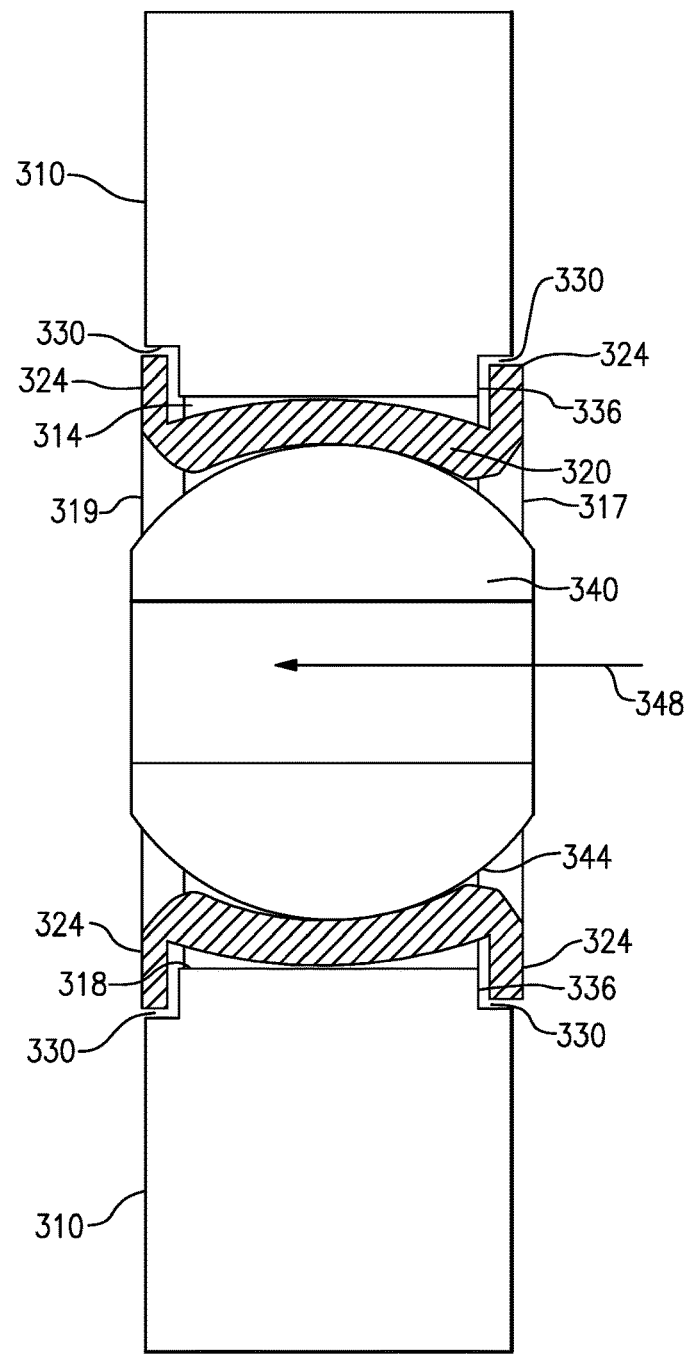
FIG. 15 is a partial sectioned view of an end fitting connector assembly that is made in accordance with another exemplary embodiment.
Figure 16A:
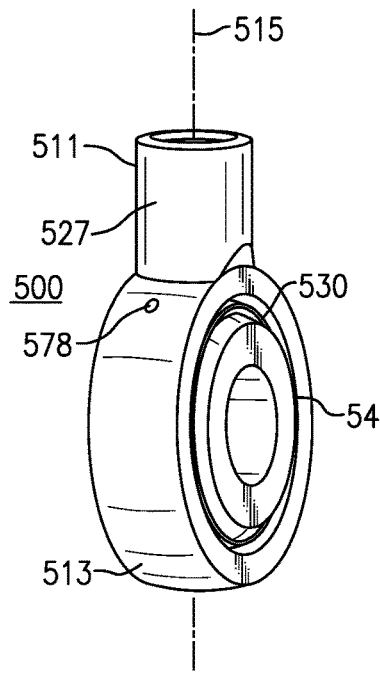
FIG. 16(a) is a perspective view of an end fitting connector assembly in accordance with another exemplary embodiment.
Figure 16B:
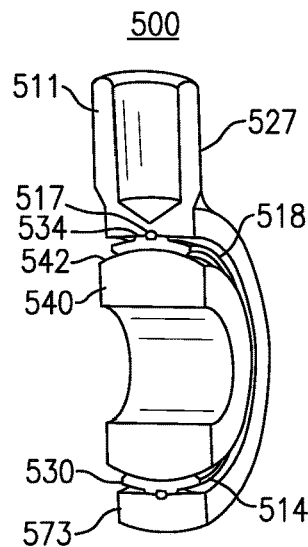
FIG. 16(b) is a sectioned view of the end fitting connector assembly of FIG. 16(a)
Figure 16C:
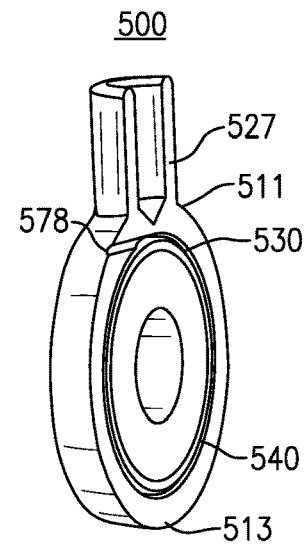
FIG. 16(c) is another sectioned view of the end fitting connector assembly of FIGS. 16(a) and 16(b)
Figure 16D:
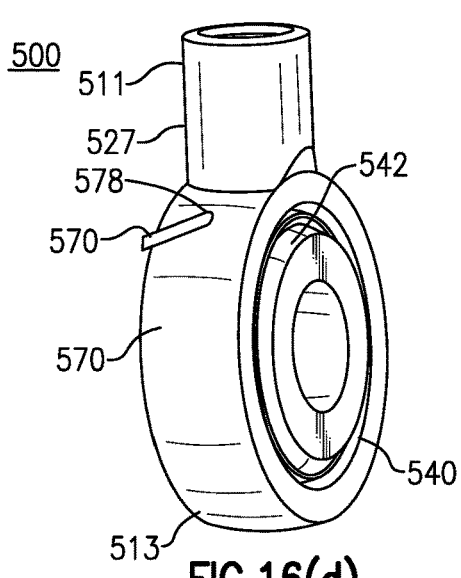
FIG. 16(d) is the perspective view of the end fitting connector assembly of FIG. 16(a), including a feature that enables release of a ball mount from the end fitting.
Figure 16E:
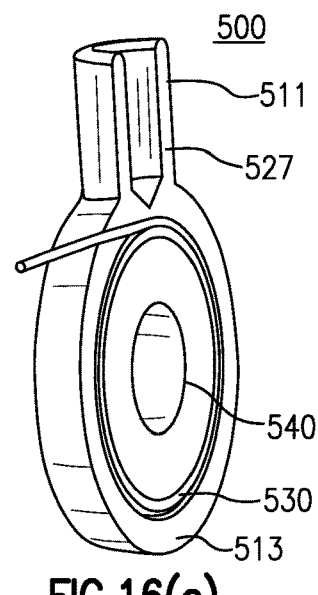
FIG. 16(e) is the sectioned view of the end fitting connector assembly of FIG. 16(c) including the ball mount release feature.

Various other end fitting connector assembly designs are possible. For example and as depicted in FIG. 15, another end fitting connector assembly 300 is partially shown in section. Similarly to previously described versions, the end fitting connector assembly 300 includes an end fitting 310 having a proximal end, a distal end and a through opening 314 that is transverse to an end fitting axis extending through the proximal end and the distal end, the through opening 314 being appropriately sized for receiving and retaining an elastically deformable race 320. According to this version, a peripheral wall 318 of the through opening 314 includes a pair of recessed portions 330 defined at respective first and second ends 317, 319 of the through opening 314. The elastically deformable race 320 is a ring-like member preferably made from a flexible and durable plastic having a pair of opposing outwardly directed peripheral end portions 324 that are configured for engagement within the recessed portions 324 of the through opening 314 of the end fitting 310. As shown, a ball mount 340 (partially shown) is snap-fitted within the through opening 314, the ball mount 340 having a spherical outer surface 344 that engages the inner surface of the race 320 and elastically deforms same to create positive engagement. When initially fitted as shown in FIG. 15, the inner surface of the elastically deformable race 320 substantially conforms to the outer spherical surface 344 of the ball mount 340 while the center portion of the outer surface of the race 320 is further caused to directly engage the peripheral wall 318 of the through opening 314 of the end fitting 310, thereby positively retaining the ball mount 340 to the end fitting connector assembly 300.

According to this embodiment and following assembly, movement of the ball mount 340 in the axial direction 348 causes a rearward peripheral end portion 330 of the race 320 to engage against a shoulder 336 of the peripheral wall 318 adjacent the recessed portion 330 of the through opening 314, preventing the elastically deformable race 320 from movement along with the ball mount 340 in the axial direction 350. (Due to the spherical outer surface 344 of the ball mount 340, such engagement effectively prevents further movement of the race 320 to enable disassembly of the ball mount 340 from the end fitting connector assembly 300. Given the symmetrical design of the end fitting and the spherical surface of the ball mount 340, axial movement of the ball mount 340 in the opposite direction (not shown) would produce a similar effect.

Still other variations are possible. For example and referring to FIGS. 16(*a*)-16(*e*), there is depicted an end fitting connector assembly 500 made in accordance with yet another exemplary embodiment. As in the preceding designs, the end fitting connector assembly 500 includes an end fitting 510 having a distal end 511, a proximal end 513 and an end fitting axis 515 passing through the first and second ends 511, 513. A through opening 514 provided between the first and second ends 511, 513 of the end fitting 510 extends in a direction that is transverse to the end fitting axis 515 and is defined by a peripheral wall 518. The proximal end 513 of the end fitting 510 includes an engagement portion 527 that is configured to secure a rod end (not shown).

The end fitting connector assembly 500 according to this embodiment further includes a elastically deformable race 530 that is mounted or installed into the through opening 514 in which an exterior or outer surface of the race 530 engages the peripheral wall 518 and an interior or inner surface of the race 530 is configured and sized to engage the outer spherical surface 542 of a ball mount 540. As in the preceding embodiment, each of the interior and exterior surfaces of the flexibly deformable race 530 are substantially spherical or at least angled.

Figure 17A:
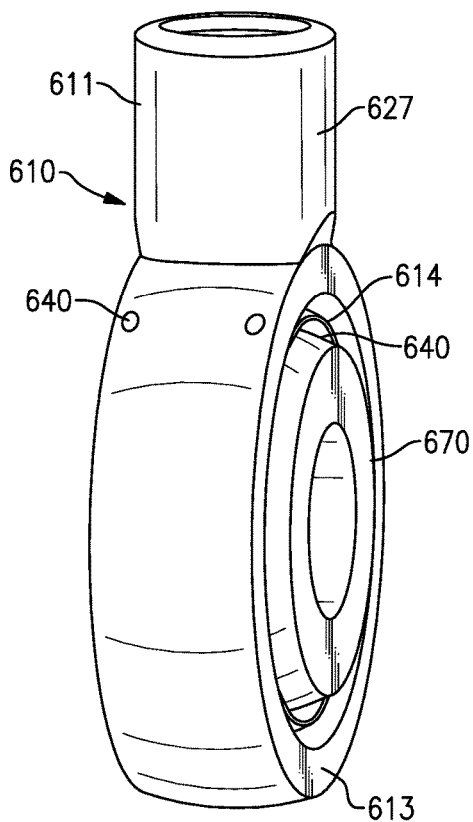
FIG. 17(a) is a side perspective view of an end fitting connector assembly in accordance with yet another exemplary embodiment.
Figure 17B:
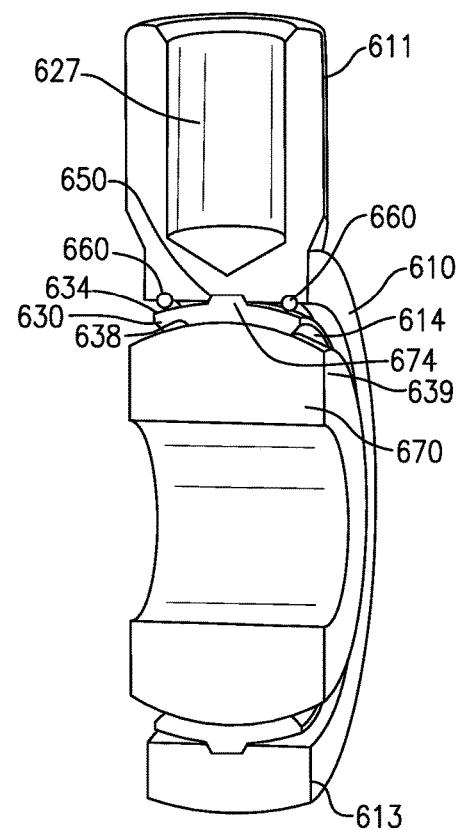
FIG. 17(b) is a sectioned view of the end fitting connector assembly of FIG. 17(a)

According to this embodiment, the exterior surface of the race 530 and the peripheral wall 518 of the end fitting 510 include aligned grooves 517, 534, respectively in which the grooves 534 of the end fitting 510 include angled or tapered wall surfaces, shown only in FIG. 16(*b*), which upon attachment to the ball mount 540 combine to create a camming action that prevents or substantially restricts disassembly when the ball mount 540 is moved axially. An opening 578 is provided in the exterior surface of the end fitting 510 that extends through the end fitting 510 to the peripheral wall 518 and to the spacing between the grooves 517, 534. According to this specific embodiment, the opening 578 is sized to accommodate a release tool, such as an axial section of wire 570 or other suitably configured member that can be introduced through the opening 578 provided in the exterior surface of the end fitting 510 and directly into the spacing defined between the aligned grooves 517, 534. The presence of the axial section of wire 570 creates an obstruction that prevents the camming action between the surfaces of the elastically deformable race 530 and the end fitting 510 and more easily permits disassembly of the ball mount 540 from the end fitting connector assembly 500. Another embodiment of an end fitting connector assembly 600 is depicted in FIGS. 17(*a*) and 17(*b*). As in the preceding, the connector assembly 600 similarly includes an end fitting 610, such as a clevis or similar component, having a distal end 611, a proximal end 613 having an engagement portion 627, and a through opening 614 that extends in a direction that is transverse to an end fitting axis extending through the distal and proximal ends 611, 613. An elastically deformable race 630 is a ring-like member including an outer surface 634 that engages a peripheral wall 618 of the through opening 614 and an inner surface 638 that is configured and sized to engage the outer spherical surface 674 of a ball mount 670 in a snap fitting arrangement. Similar to the embodiment previously described with regard to FIGS. 2-5, for example, each of the inner and outer surfaces 638, 634 of the race 630 are defined by a spherical configuration wherein the outer surface 634 of the race 630 includes an annular circumferential ridge 639 which is configured to engage a continuous groove 650 that is defined in the peripheral wall 618 when the ball mount 670 is snap fitted to the assembly 600. The foregoing feature insures that when assembled, the elastically deformable race 630 is disposed in a predetermined position.

According to this embodiment, a pair of openings 640 are provided in the exterior surface of the end fitting 610 that extend into the assembly 600 and between the elastically deformable race 630 and the peripheral wall 618 of the end fitting 610 at spaced portions thereof. The openings 640 are spaced axially from one another on opposing sides of the groove 650 and annular ridge 639 that secures the race 630 to the end fitting 610. In terms of operation, axial sections of locking wire(s) 660 are provided and inserted into each of the openings 640, the locking wires 660, FIG. 17(*b*), being disposed between the race 630 and the end fitting 610 to prevent engagement between the ball mount 670 and the race 630 when the ball mount 670 is pulled from either axial direction via the through opening 614 and permitting disassembly of the ball mount 670 from the end fitting 610 portion of the assembly 600.

Yet another variation of an end fitting connector assembly 700 is depicted in FIGS. 18(*a*)-18(*d*). According to this specific embodiment and similar to prior versions, the end fitting connector assembly 700 includes an end fitting 710 that is defined by a transverse through opening 714 formed in a distal end having a peripheral wall 718 that is sized and configured to accommodate an elastically deformable race 730. The elastically deformable race 730 is defined by a ring-like member having an outer surface 734 and an inner surface 738 in which the outer surface 734 further includes a circumferential raised ridge 740 at about the center thereof configured for engaging a groove 750 formed in the peripheral wall 718 of the end fitting 710. The latter groove 750, according to this embodiment, is further defined with tapered walls at each end of the groove 750 which create a resistance force against the race 730 and more specifically the circumferential raised ridge 740 following assembly. In this embodiment, each of the circumferential raised ridge 740 of the race 730 and the groove 750 of the end fitting 710 further include an additional annular groove or notch 744, 748, respectively, each of the grooves 744, 748 being aligned with one another upon assembly.

In this embodiment, a wire clip 780 defined by a ring-like configuration is initially provided within the annular groove 748 defined in the peripheral wall 718 of the end fitting 710. The wire clip 780 extends along substantially the entire circumference of the groove 748 and has respective ends 784 that extend to a projecting portion of the end fitting 710 and more specifically a through opening 788 of the end fitting 710 that extends transversely to the axis of the through opening 714. When assembled, a ball mount 770 includes an outer spherical surface 774 that is engaged by the inner surface 738 of the race 730 in a snap-fitting engagement.

Figure 18A:
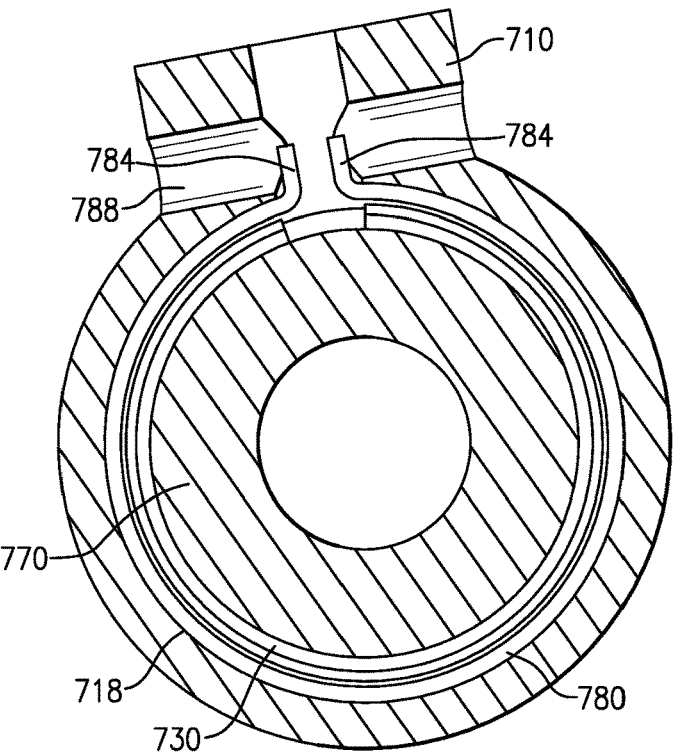
FIG. 18(a) is a sectioned view of an end fitting connector assembly in accordance with another exemplary embodiment.
Figure 18B:
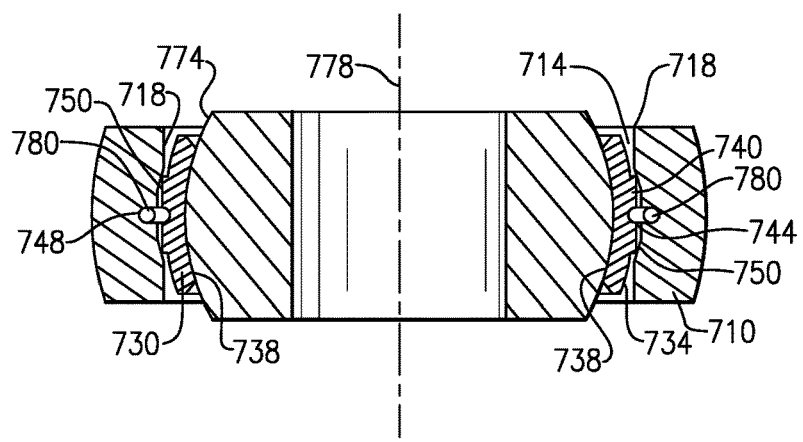
FIG. 18(b) is a sectioned view about lines 18-18 of the connector assembly of FIG. 18(a), showing the assembly in a locked condition.

In terms of operation and referring to FIGS. 18(a) and 18(b), the wire clip 780 is initially radially biased such that the wire clip 780 is entirely positioned within the defined groove 748 of the end fitting 710, as shown most clearly shown in FIG. 18(b). In this position, the inner surface 738 of the elastically deformable race 730 is engaged with the outer surface 774 of the spherical ball mount 770 and the circumferential raised ridge 740 of the race 730 is engaged within the groove 750 of the peripheral wall 718 of the end fitting 710. In this position, the race 730 is constrained into engagement with the end fitting 710 and the ball mount 770 in a manner that prevents disassembly without concerted effort or as in this embodiment, a tool.

More specifically, the outer circumferential ridge 740 of the race 730 is retained within the groove 750 defined by the end fitting 710 and the angled end walls of the groove 750 prevent the race 730 from movement in the direction along the axis 778 of the through opening 714 and correspondingly prevent movement of the ball mount 770 against the constrained race 730.

Figure 18C:
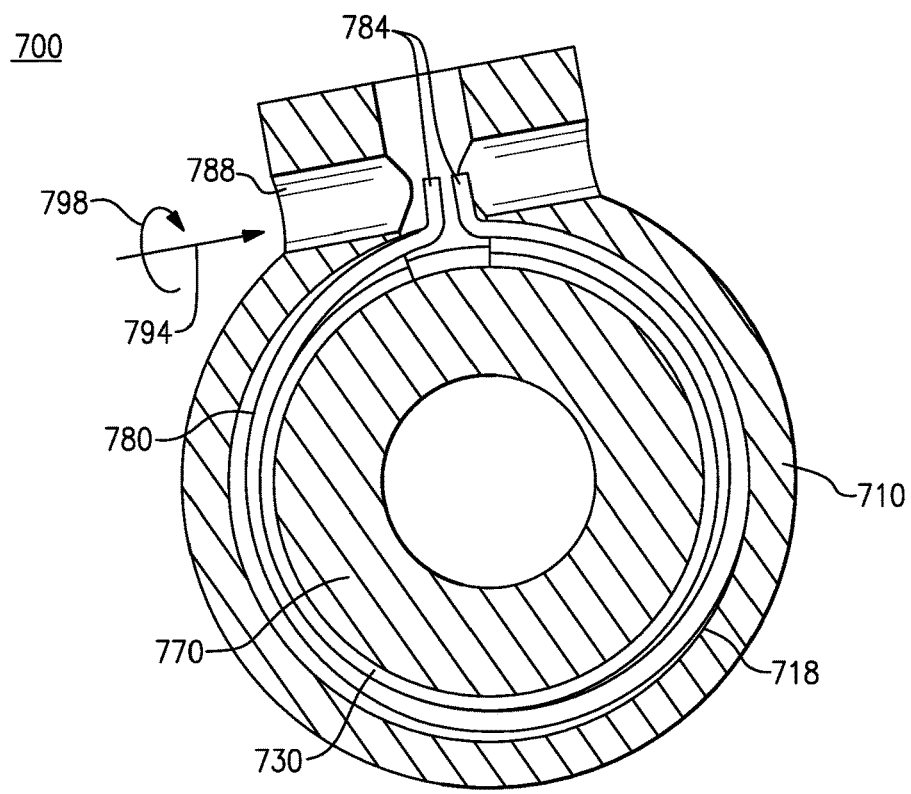
FIG. 18(c) is the sectioned view of the end fitting connector assembly of FIG. 18(a) in which the end fitting connector assembly is in an unlocked condition.
Figure 18D:
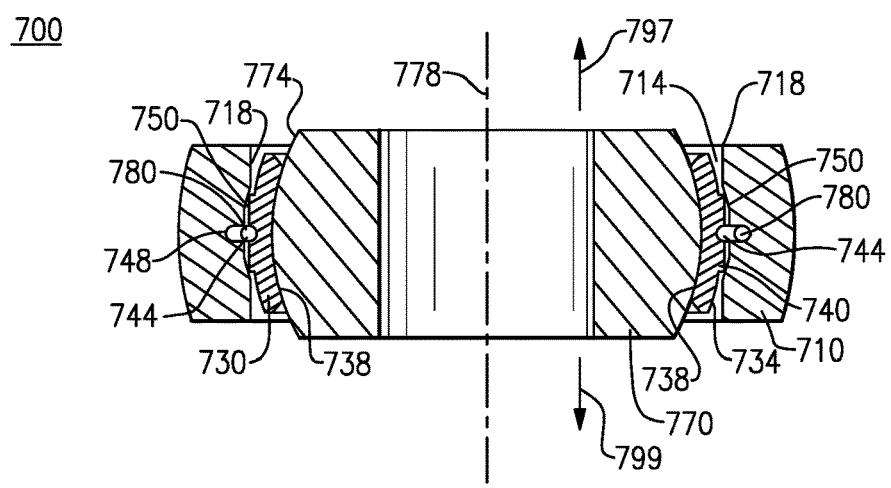
FIG. 18(d) is the sectioned view about lines 18-18 of the connector assembly of FIG. 18(c)

When a tool (not shown) is placed into the opening 788 and into engagement with one of the extending ends 784 of the wire clip 780, as shown in FIGS. 18(c) and 18(d) in the direction 794, a peripheral portion of the wire clip 780 is at least partially released from the groove 748 of the end fitting 710 and becomes at least partially disposed within the aligned groove 744 of the race 730. This latter position creates locking engagement between the race 730 and the end fitting 710, preventing relative movement. As a result, the outer spherical surface 774 of the ball mount 770 can easily move against the inner surface 738 of the race 730. As a result, the ball mount 770 can be easily disassembled. According to one version and with the end fitting connector assembly 700 supported against a fixed surface (not shown), the entering tool upon engaging the extending end of the wire clip 780 can be rotated in the direction 794 that facilitates this disassembly in either direction 797, 799 of the through opening 714.

Yet another alternate embodiment of an end fitting connector assembly 800 is depicted in FIGS. 19 (a) and 19 (b). This assembly 800, like the preceding, includes an end fitting 810 defined by a distal end and a proximal end, the distal end being further defined by a transverse through opening 814 having a peripheral wall 818. An elastically deformable race 830 is further provided having an outer surface 834 and an inner surface 838 in which the inner surface 838 is defined by a spherical or substantially spherical configuration that is configured for engaging the outer spherical surface 874 of a ball mount 870. A circumferential raised ridge 840 formed on the outer surface 834 of the race 830 is compressively engaged with the peripheral wall 818 of the end fitting 810 upon assembly, the latter wall 818 including a profile having a plurality of stepped surfaces 845, 847 spaced from a groove or notch 850 disposed at about the center of the axial span of the peripheral wall 818.

According to this specific embodiment, the circumferential ridge 840 of the race 830 is further defined by a notch or groove 842 at about the center of the ridge 840, each of the grooves 842, 850 being substantially the same width dimension. The first pair of stepped surfaces 845 of the peripheral wall 818 of the through opening 814 define a first recessed portion 888 that is sized to accommodate the raised circumferential ridge 840 and permit limited movement of the race 830 in either axial direction 890. The second set of stepped surfaces 847 according to this embodiment extend radially inward and define an additional recessed portion 889.

Figure 19A:
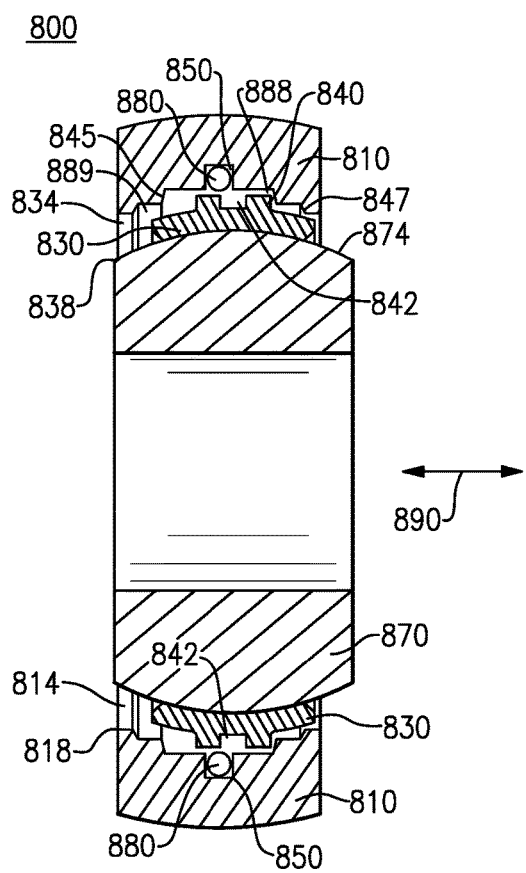
FIG. 19(a) is a partial sectioned view of an end fitting connector assembly in accordance with yet another exemplary embodiment and in which the connector assembly is in a locked condition.

A wire clip 880 is initially disposed within the end fitting 810 and more specifically within the groove 850 of the end fitting 810, the wire clip 880 having a diameter that enables same to be fully and solely retained within the groove 850 initially. As shown in FIG. 19(a), the elastically deformable race 830 in the initial assembled condition can translate slightly along in either axial direction relative to the through opening 814 of the connector assembly 800 within the recessed portion 888, but is prevented or at least constrained from further movement based on this geometry. Based upon this constraint, only limited movement is permitted between the ball mount 870 and the race 830 and disassembly is made difficult without the application of a greater amount of force than required for purposes of assembly.

Figure 19B:
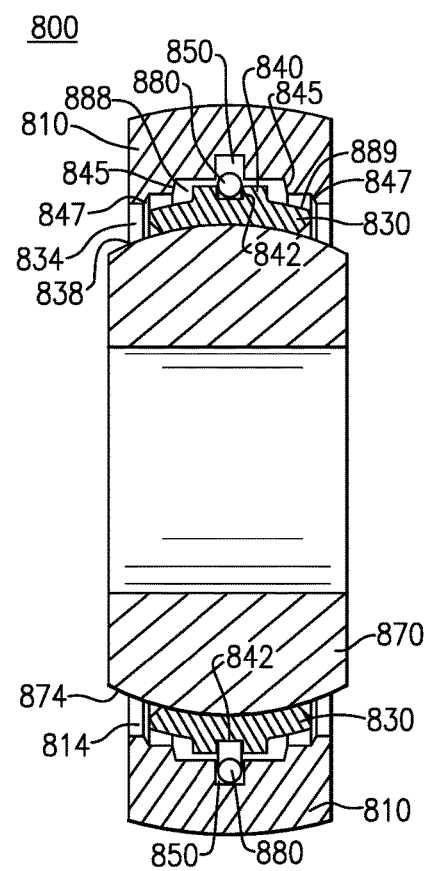
FIG. 19(b) is the partial sectioned view of the end fitting connector assembly of FIG. 19(a) with the connector assembly in an unlocked condition.

When the wire clip 880 is acted upon, for example in the manner previously illustrated according to FIGS. 18(c) and 18(d) using a tool (not shown), and as shown in FIG. 19(b) at least a peripheral portion of the wire clip 880 is caused to move radially inward, away from the confines of the groove 850 of the peripheral wall 818 of the end fitting 810 and at least partially into the groove 842 formed on the circumferential raised ridge 840 of the race 830. In this latter position, the race 830 becomes effectively locked meaning that the race 830 is prevented from any movement independent of the end fitting 810 in the direction 890. Therefore, the ball mount 870 is not constrained by the race 830 and can be easily disassembled in either direction 890.

Figure 20A:
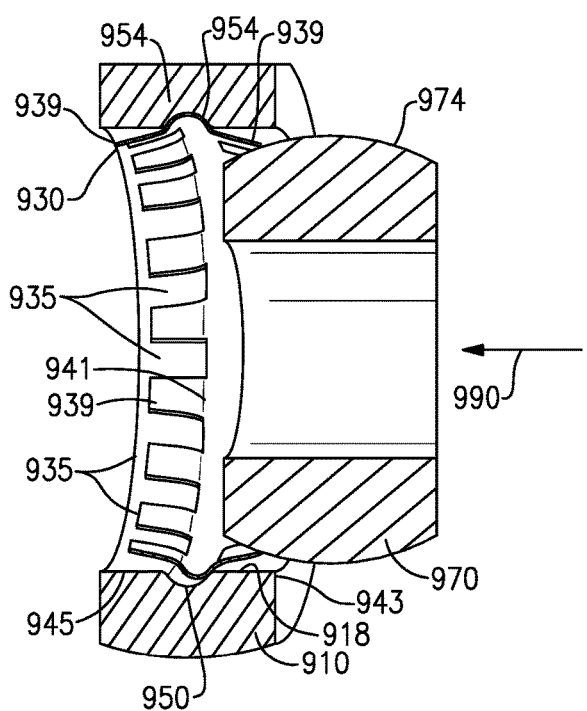
FIG. 20 (a) is a partial sectioned and partially assembled view of an end fitting connector assembly in accordance with yet another exemplary embodiment.
FIG. 20(b) is the partial sectioned view of the end fitting connector assembly of FIG. 20(a) as assembled to a ball mount.
FIG. 20(c) is a side perspective view of the end fitting connector assembly of FIGS. 20(a) and 20(b).
Figure 20B:
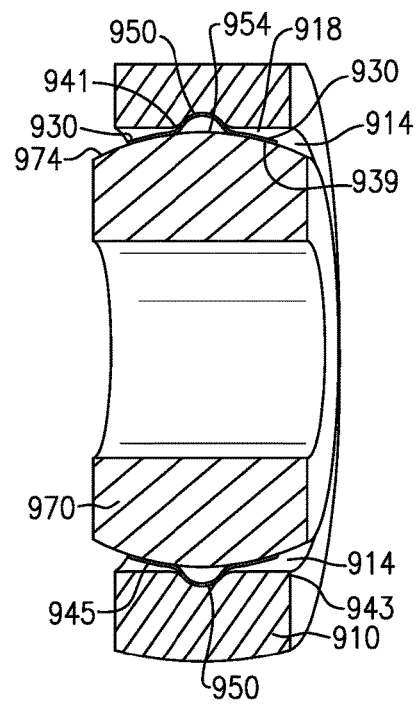
Figure 20C:
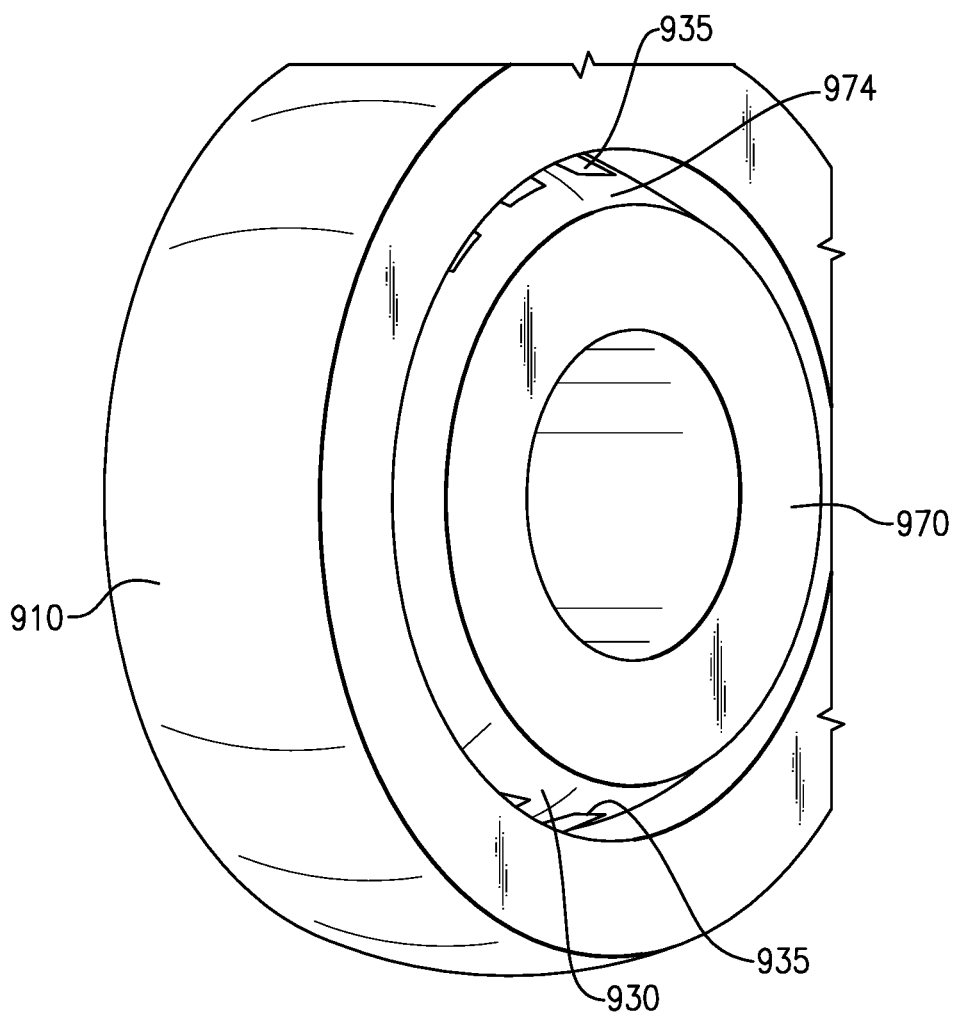

Minimally, each of the elastically deformable races described in the prior embodiments can be formed from a plastic material in which fabrication by molding can facilitate manufacture, including the salient features such as the inner and outer surfaces as well as the circumferential outer edge and the grooves. According to another exemplary embodiment and referring to FIGS. 20(a)-20(c), another end fitting connector assembly 900 can be provided that includes an end fitting 910 defined by a transverse through opening 914 and a peripheral wall 918 and an elastically deformable race 930. According to this specific embodiment, the race 930 is defined by a ring-like section made from a metal, such as bronze or steel, having a through opening that is aligned with the through opening 914 of the end fitting 910, when assembled. The peripheral wall 918 of the end fitting 910 includes an annular groove 950 disposed at about the center of the axial dimension of the through opening 914. The groove 950 according to this specific embodiment is defined by a substantially concave configuration.

The race 930 is defined by a thin ring-like structure including an outer surface 934 and an inner surface 938, as well as opposing first and second ends 943, 945. Each of the first and second ends 943, 945, including the outer and inner surfaces 934, 938, are mirror images of one another and are commonly defined by a plurality of spaced castellations 935 equally spaced and arranged circumferentially. Each castellation 935 according to this embodiment is a cantilevered spring having an outer end 939 that is reflexed radially inward relative to an inner end 941. Each of the inner ends 941 of the castellations 935 on each side 943, 945 of the race 930 terminate commonly to a center concave portion 954 extending radially outward and initially retained within the groove 950, when assembled, as shown in FIG. 20(*a*).

In operation and referring to FIG. 20(*a*), the race 930 is shown as assembled and in which the radially protruding center portion 954 of the race 930 is engaged with the groove 950 formed in the peripheral wall 918 of the transverse through opening 914 of the end fitting 910 in the direction 990. It should be noted that assembly can proceed from either axial end of the herein described assembly 900. As the ball mount 970 is engaged at one of the ends 943 of the assembled race 930, the outer spherical surface 974 of the ball mount 970 directly engages the outer ends 939 of the spring-like castellations 935 causing the outer ends 939 on that side 943 of the race 930 to deflect radially outward toward the peripheral wall 918. As the ball mount 970 is further advanced in the axial direction 990, the spherical contour of the outer surface 974 causes the outer ends 939 of the castellations 935 to additionally deflect elastically and further causing the race 930 to pivot about the concave projecting portion 954 within the groove 950. This pivoting action enables the ball mount 970 to be fully assembled into the position shown in FIG. 20(*b*). In this position, the race 930 is prevented from axial movement by the peripheral wall 918 of the end fitting 910 and more specifically the engagement of the protruding portion 954 of the race 930 within the groove 950 of the peripheral wall 918 of the through opening 914 and the spherical outer wall 974 of the ball mount 970. Due to the tapered geometry of the castellations 935 and the biasing forces provided, disassembly is thereby prevented without use of a tool or at least from occurring easily using a greater applied force than that applied during assembly.

It will be readily apparent that other modifications and variations can be contemplated to be adequately covered by the inventive concepts that are described herein, including the following claims.

I claim:

1. An end fitting connector assembly comprising:
   an end fitting having a first end, an opposing second end and an axis passing through the first and second ends, the end fitting being a unitary component that further includes a through opening at the first end that is transversely arranged relative to the end fitting axis, the through opening having opposing ends and an annular peripheral wall extending between the opposing ends of the through opening;
   a unitary and elastically deformable race fitted into the through opening of the end fitting through either of the opposing ends of the through opening of the end fitting and sized to have an outer surface of the race engage the annular peripheral wall, the race having an annular inner surface, wherein a through opening of the race includes opposing ends in which the through opening of the race is aligned with the through opening of the end fitting, the race being defined by a split-ring configuration including a slit to enable the race to be snapfittingly engaged within the through opening of the end fitting; and
   the inner surface of the race being sized to engage a ball mount from either end of the through opening of the race, wherein one of the annular peripheral wall of the through opening of the end fitting and the outer surface of the race includes a raised circumferential ridge that extends continuously about an entire circumference of one of the annular peripheral wall of the through opening of the end fitting or the outer surface of the race, and wherein the other of the outer surface of the race and the annular peripheral wall of the through opening of the end fitting includes an annular groove that extends continuously about an entire circumference of the other of the outer surface of the race or the annular peripheral wall of the through opening of the end fitting and is sized for receiving the raised circumferential ridge to retain the elastically deformable race in a predetermined position in the through opening of the end fitting and wherein the raised circumferential ridge and annular groove are defined midway between the opposing ends of each through opening, enabling the ball mount to be accessed for assembly and disassembly from either end of the through opening of the race, wherein the race is made from a plastic material, the race being sized larger than an inner diameter of the through opening of the end fitting and in which the race is assembled by opening the split ring at the formed slit and expanding the race into a spiral to permit assembly into the through opening of the end fitting in which the engagement features of the race and the end fitting combine to form a snap fit.

2. The end fitting connector assembly as recited in claim 1, in which at least one of the annular groove or the raised circumferential ridge is defined by opposing parallel edges.

3. The end fitting connector assembly as recited in claim 1, in which at least one of the annular groove or the raised circumferential ridge is defined by tapered edges.

4. The end fitting connector assembly as recited in claim 3, in which the tapered edges are tapered by 45 degrees.

5. The end fitting connector assembly as recited in claim 1, wherein at least one of the outer surface or the inner surface of the race is defined by a spherical surface.

6. The end fitting connector assembly as recited in claim 1, wherein the end fitting is configured to retain a rod end along the end fitting axis.

7. The end fitting connector assembly as recited in claim 6, in which the first end of the end fitting includes an engagement portion configured for receiving and fixedly retaining the rod end.

8. The end fitting connector assembly as recited in claim 1, in which the slit is defined by a scarf cut.

9. The end fitting connector assembly as recited in claim 8, in which the scarf cut is defined by an angle of at least 15 degrees relative to a center axis of the race.

10. The end fitting connector assembly as recited in claim 1, in which the outer surface of the race is defined by at least one angled surface.

11. A method for enabling one-handed operation of an end fitting connector assembly, the method comprising:
   providing an end fitting having a first end, an opposing second end and a through opening at the first end that is transverse to an axis extending between the first and second ends, the through opening having opposing open ends and a continuous annular peripheral wall, the end fitting being a unitary component;
   providing an elastically deformable race as a unitary component having a split-ring configuration having a formed slit, the race being sized and engaged within the through opening of the end fitting by attachment through either of the opposing open ends of the through opening of the end fitting, the race having an outer surface and an inner surface configured to directly engage a spherical ball mount and in which the elastically deformable race includes a through opening having opposing ends aligned with the opposing open ends of the through opening of the end fitting when assembled thereto;

providing engagement features on the outer surface of the race and the annular peripheral wall of the end fitting, the engagement features including a circumferential raised ridge formed on one of the outer surface of the race or the annular peripheral wall of the end fitting that extends continuously about an entire circumference of one of the outer surface of the race or the annular peripheral wall of the through opening of the end fitting, and an annular groove provided on the other of the outer wall surface of the race or the annular peripheral wall of the end fitting that extends continuously about an entire circumference of the other of the outer wall surface of the race or the annular peripheral wall of the through opening of the end fitting and, assembling and disassembling the spherical ball mount from either end of the through opening of the race wherein the race is made from a plastic material, the race being sized larger than an inner diameter of the through opening of the end fitting and in which the race is assembled by opening the split ring at the formed slit and expanding the race into a spiral to permit assembly into the through opening of the end fitting in which the engagement features of the race and the end fitting combine to form a snap fit.

12. The method as recited in claim 11, wherein at least one of the annular groove and raised circumferential ridge include tapered edges.

13. The method as recited in claim 11, wherein at least one of the annular groove and raised circumferential ridge is defined by substantially parallel edges.

14. The method as recited in claim 11, wherein the slit is defined by a scarf cut.

15. An actuator assembly comprising:
a rod member having at least one end; and
an end fitting connector assembly attached to the at least one end of the rod member, the end fitting connector assembly comprising:
an end fitting having a first end, a second end and a through opening at the first end of the end fitting extending in a direction that is transverse to an axis passing through the first and second ends, the through opening having opposing ends and an annular peripheral wall and in which the end fitting is a unitary component; and
an elastically deformable race, the race being a unitary component that is disposed within the through opening and attached thereto through either of the opposing ends of the end fitting, the race including an inner surface, an outer surface and a through opening that is aligned with the through opening of the end fitting in which the outer surface of the race is engaged with the annular peripheral wall of the end fitting, and in which the race is defined by a split-ring configuration including a slit and wherein the race and the end fitting have corresponding engagement features that retains the race in a predetermined position, and in which a spherical ball mount is attached in engagement within the through opening of the race and is accessible for assembly or disassembly from either side of the opening and in which the engagement features include at least one of circumferential raised ridge formed on one of the outer surface of the race and the annular peripheral wall of the through opening of the end fitting and configured to extend continuously along an entire circumference of one of the outer surface of the race and the annular peripheral wall of the through opening of the end fitting, and an annular groove formed on the other of the outer surface of the race or the annular peripheral wall of the through opening of the end fitting and configured to extend continuously along an entire circumference of the other of the outer surface of the race and the annular peripheral wall of the through opening of the end fitting, and in which the engagement features are provided at the midpoint of the through opening of the race and the end fitting relative to the opposing open ends of each through opening, wherein the race is made from a plastic material, the race being sized larger than an inner diameter of the through opening of the end fitting and in which the race is assembled by opening the split ring at the slit and expanding the race into a spiral to permit assembly into the through opening of the end fitting in which the engagement features of the race and the end fitting combine to form a snap fit.

16. The actuator assembly as recited in claim 15, wherein at least one of the annular groove and the raised circumferential ridge include angled walls.

17. The actuator assembly as recited in claim 15, in which the slit is an angled scarf cut.

* * * * *